United States Patent
Ujimoto et al.

(10) Patent No.: US 7,712,816 B2
(45) Date of Patent: May 11, 2010

(54) MOVABLE FLOOR APPARATUS FOR VEHICLE

(75) Inventors: Takushi Ujimoto, Fuchu-cho (JP); Terumi Akazawa, Osaka (JP); Teiji Hiyori, Fuchu-cho (JP); Keisuke Iida, Fuchu-cho (JP); Tomonori Ohtsubo, Fuchu-cho (JP); Hiroki Uemura, Fuchu-cho (JP); Reiji Kikuchi, Fuchu-cho (JP)

(73) Assignees: Mazda Motor Corporation (JP); Delta Kogyo Co., Ltd. (JP); Toyo Seat Co., Ltd. (JP)

( * ) Notice: Subject to any disclaimer, the term of this patent is extended or adjusted under 35 U.S.C. 154(b) by 307 days.

(21) Appl. No.: 11/892,408

(22) Filed: Aug. 22, 2007

(65) Prior Publication Data

US 2008/0047771 A1 Feb. 28, 2008

(30) Foreign Application Priority Data

| Aug. 25, 2006 | (JP) | ............................. 2006-229779 |
| Aug. 25, 2006 | (JP) | ............................. 2006-229780 |
| Aug. 25, 2006 | (JP) | ............................. 2006-229781 |

(51) Int. Cl.
*B60N 3/06* (2006.01)
*B62J 25/00* (2006.01)
*G05G 1/18* (2006.01)

(52) U.S. Cl. ........................... 296/75; 74/564; 180/326; 296/97.23

(58) Field of Classification Search ................... 74/564; 180/326, 330; 296/75, 97.23
See application file for complete search history.

(56) References Cited

U.S. PATENT DOCUMENTS

| 2,862,761 | A | * | 12/1958 | Scheidegger | ................. 296/75 |
| 3,047,088 | A | * | 7/1962 | Murrell | ..................... 180/90.6 |
| 3,059,960 | A | | 10/1962 | Komorowski et al. | |

(Continued)

FOREIGN PATENT DOCUMENTS

EP 1238851 A1 9/2002

(Continued)

OTHER PUBLICATIONS

Andras Szaip; European Search Report; EP07114810; Oct. 22, 2008.

*Primary Examiner*—Glenn Dayoan
*Assistant Examiner*—Paul A Chenevert
(74) *Attorney, Agent, or Firm*—Studebaker & Brackett PC; Donald R. Studebaker

(57) ABSTRACT

A movable floor device for a vehicle, which comprises a movable board disposed beneath feet of an occupant seated in an occupant seat, a drive source disposed below the occupant seat, and a driving-force transmission mechanism adapted, according to a driving force of the drive source, to input a force directed in a selected one of frontward and rearward directions of a vehicle body, into a rear portion of the movable board. The movable board is supported in such a manner as to be selectively displaced upwardly and downwardly in response to respective ones of the frontward and rearward forces input from the driving-force transmission mechanism. The movable floor apparatus of the present invention makes it possible to allow a lowermost height position of a movable board to be set at a lower level so as to cope with various seating postures with enhanced flexibility.

12 Claims, 16 Drawing Sheets

U.S. PATENT DOCUMENTS

| | | | | |
|---|---|---|---|---|
| 3,288,239 A * | 11/1966 | Ristau | ......................... | 180/78 |
| 3,357,717 A * | 12/1967 | Samford | ..................... | 280/775 |
| 3,401,975 A * | 9/1968 | Oger | ....................... | 296/97.23 |
| 4,392,546 A * | 7/1983 | Brown et al. | ................ | 180/326 |
| 4,955,658 A | 9/1990 | Graves | | |
| 5,183,308 A * | 2/1993 | Koga et al. | ................... | 296/75 |
| 5,507,562 A | 4/1996 | Wieland | | |
| 6,318,785 B1 * | 11/2001 | Tousignant | .................. | 296/75 |
| 6,450,530 B1 * | 9/2002 | Frasher et al. | .............. | 280/735 |
| 6,474,728 B1 * | 11/2002 | Mendis et al. | .............. | 296/204 |
| 6,614,344 B1 * | 9/2003 | Frasher et al. | ........... | 340/425.5 |
| 6,634,669 B2 * | 10/2003 | Levine | ....................... | 280/735 |
| 7,364,186 B2 * | 4/2008 | Levine | ....................... | 280/731 |
| 7,419,029 B2 * | 9/2008 | Ohtsubo et al. | ............. | 180/326 |
| 7,437,229 B2 * | 10/2008 | Ohtsubo et al. | ............... | 701/49 |
| 7,556,307 B2 * | 7/2009 | Ohtsubo et al. | ............... | 296/75 |
| 2005/0109555 A1 | 5/2005 | Ohtsubo et al. | | |
| 2007/0205626 A1* | 9/2007 | Ohtsubo et al. | ............... | 296/75 |

FOREIGN PATENT DOCUMENTS

| | | |
|---|---|---|
| EP | 1 533 190 B1 | 7/2006 |
| EP | 1820687 A1 | 8/2007 |
| FR | 1155624 | 5/1958 |
| FR | 2631292 A1 * | 11/1989 |
| FR | 2689081 A1 * | 10/1993 |
| FR | 2807720 | 10/2001 |
| JP | 2004009849 A | 1/2004 |
| JP | 2005-145405 | 6/2005 |
| JP | 2005162074 A | 6/2005 |
| JP | 2005-271829 | 10/2005 |

* cited by examiner

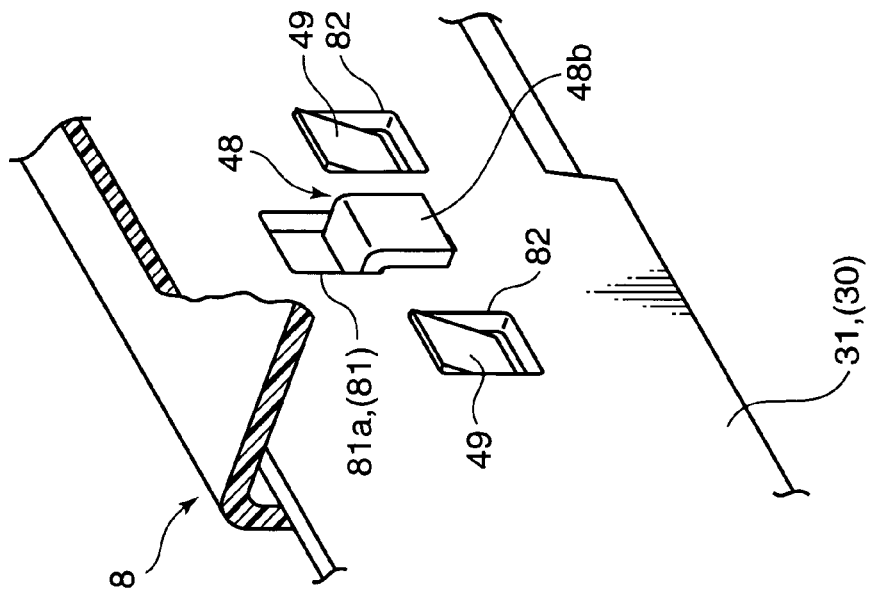
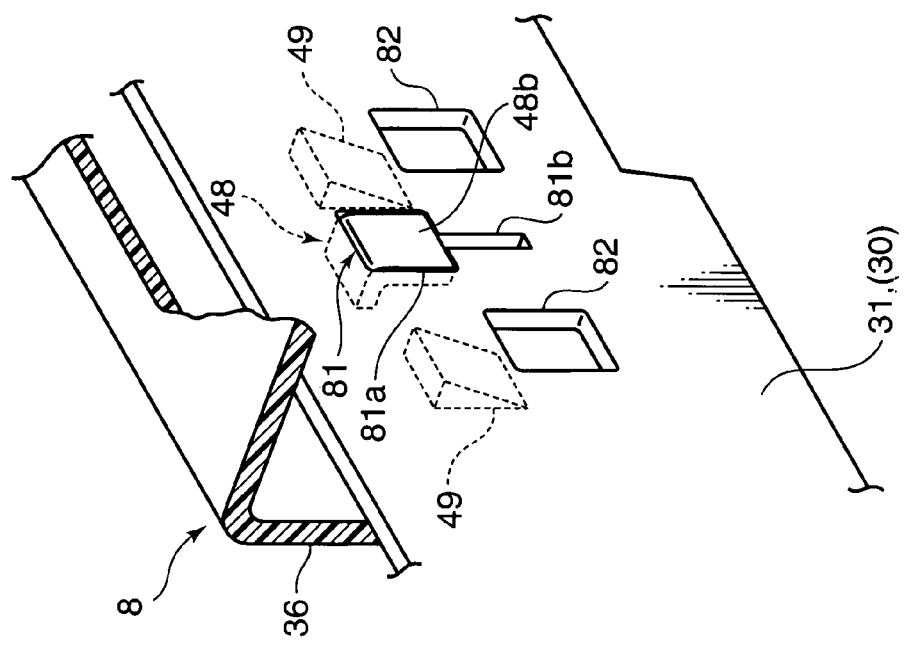

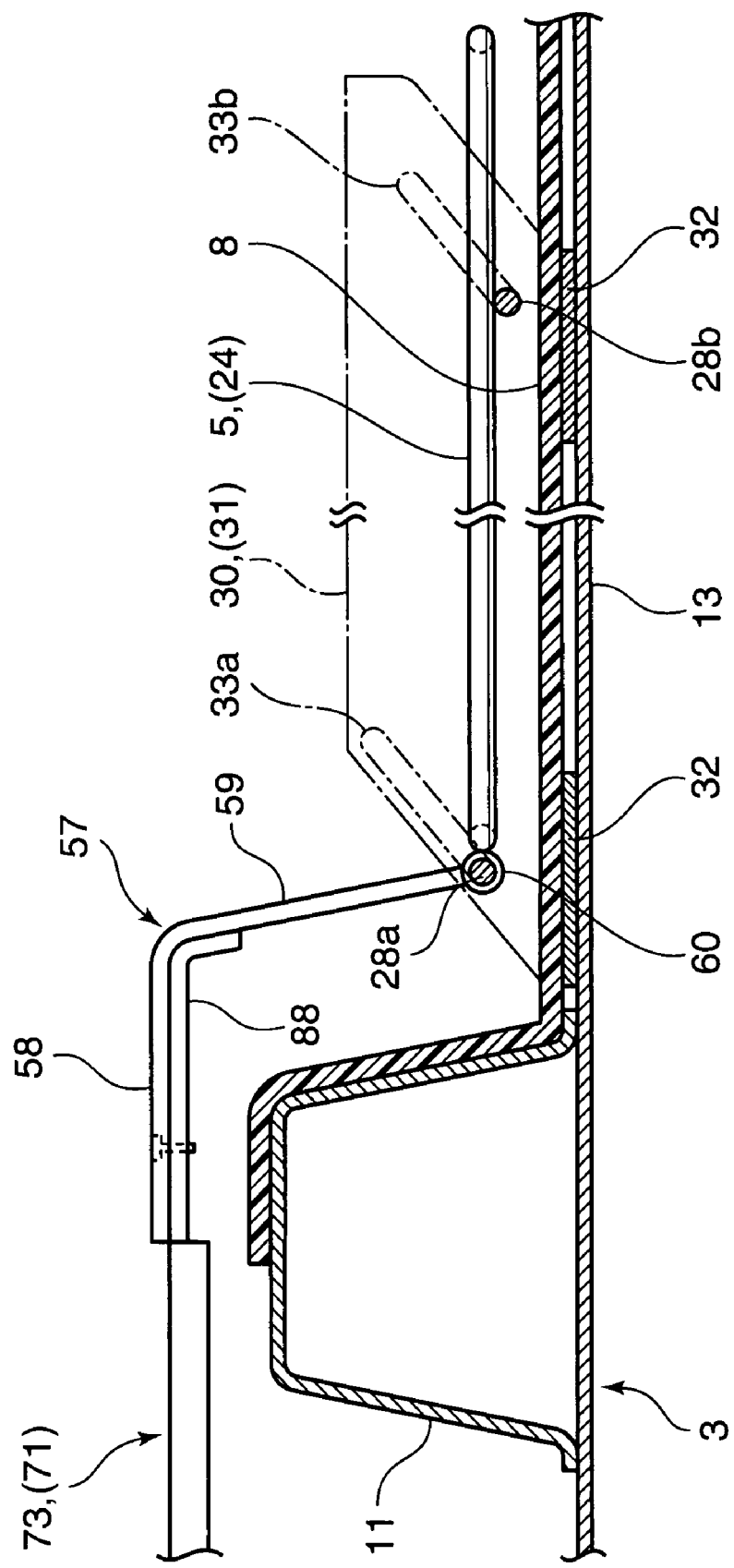

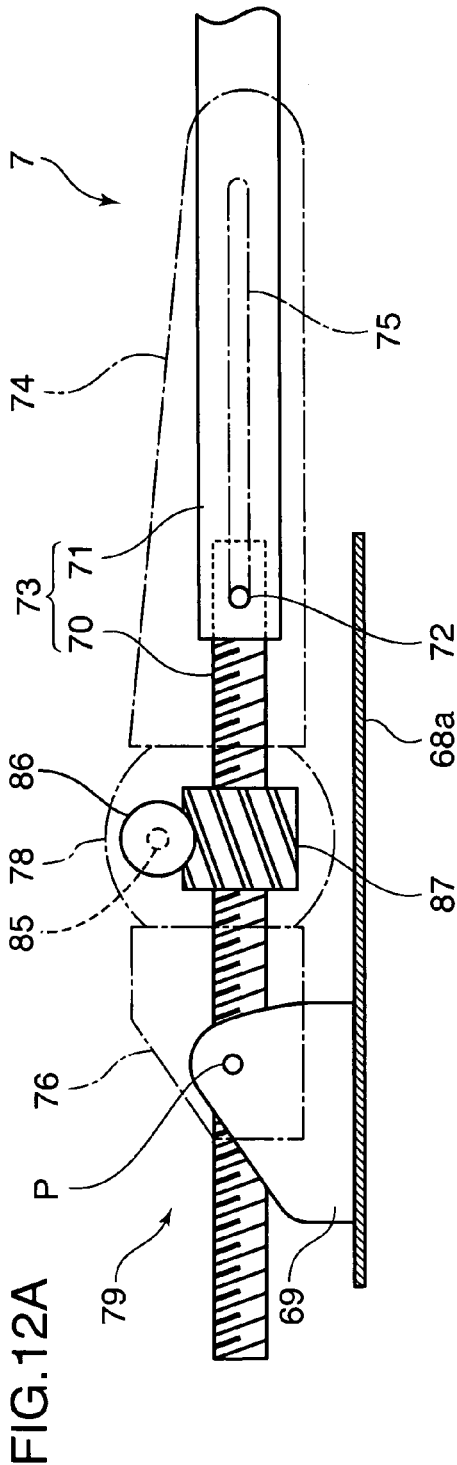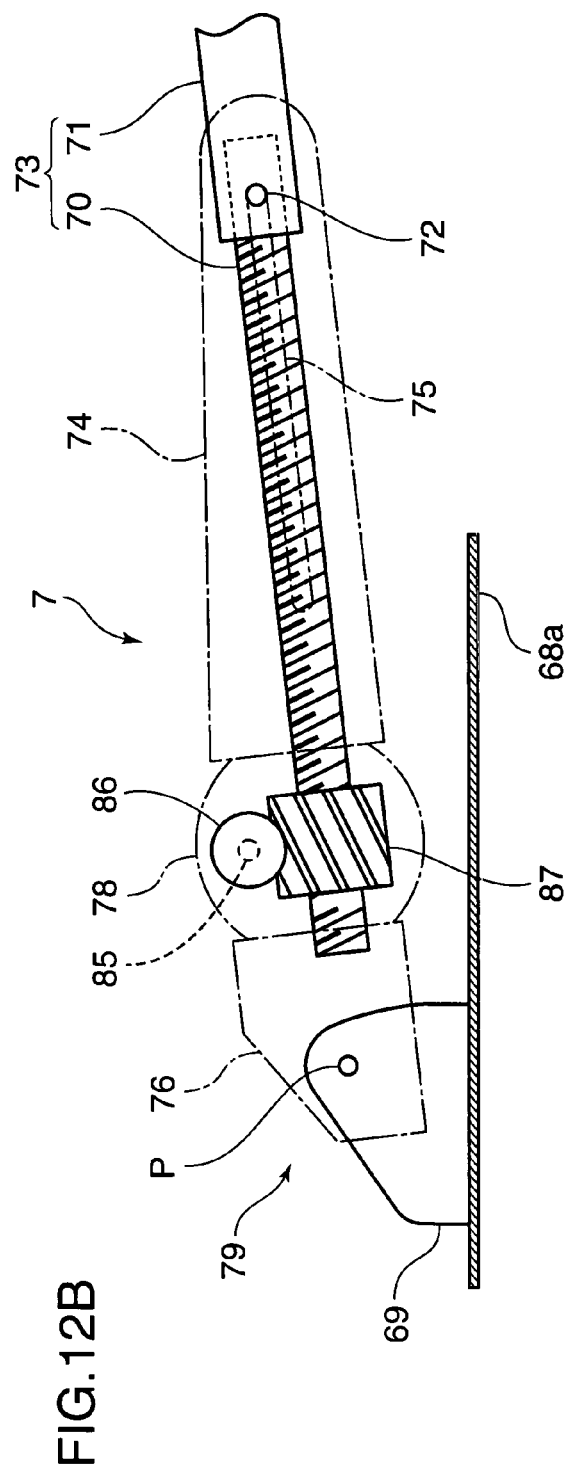
FIG.12A
FIG.12B

MOVABLE FLOOR APPARATUS FOR VEHICLE

BACKGROUND OF THE INVENTION

This application is based on Japanese Patent Application Serial Nos. 2006-229779, 2006-229780, and 2006-220781, all filed with the Japan Patent Office on Aug. 25, 2006, the contents of which are hereby incorporated by reference.

1. Field of the Invention

The present invention relates to a movable floor apparatus for a vehicle, which comprises a movable board disposed beneath feet of an occupant seated in an occupant seat, to cover an upper surface of a vehicle body floor in a liftable and lowerable manner.

2. Description of the Background Art

Heretofore, there has been proposed a movable floor apparatus comprising a movable board (movable floor) disposed in an area located above a vehicle body floor (floor panel) defining a floor surface of a vehicle body and below a foot-operated pedal, such as a brake pedal, and a lifting/lowering drive mechanism (movable-floor adjustment mechanism) based on a double linkage adapted to drivingly lift and lower the movable board relative to the vehicle body floor, as disclosed, for example, in JP 2005-271829A (Patent Publication 1). The movable floor apparatus disclosed in the Patent Publication 1 allows the movable board to be selectively displaced upwardly and downwardly in conformity to a physique of an occupant or the like so as to provide enhanced operability of the foot-operated pedal.

More specifically, in the movable floor apparatus disclosed in the Patent Publication 1, the double linkage-based lifting/lowering drive mechanism is disposed below the movable board (i.e., between the vehicle body floor and the movable board), and driven such that link members thereof are raised up and laid down to displace the movable board upwardly and downwardly. In this arrangement where the lifting/lowering drive mechanism is disposed below the movable board, a lowermost (i.e., initial) height position of the movable board is inevitably set at a relatively high level which is determined by a height dimension of an installation space required for the lifting/lowering drive mechanism. Thus, an occupant with particularly large body size (e.g., a tall occupant) is likely to have difficulty in ensuring a correct seating posture.

SUMMARY OF THE INVENTION

In view of the above circumstances, it is an object of the present invention to provide a movable floor apparatus for a vehicle, capable of allowing a lowermost height position of a movable board which is disposed beneath feet of an occupant seated in an occupant seat, in a liftable and lowerable manner, to be set at a lower level so as to cope with various seating postures with enhanced flexibility.

The present invention is directed to achieve this object by a movable floor apparatus having the following features.

Specifically, the present invention provides a movable floor apparatus for a vehicle, which includes a movable board disposed beneath feet of an occupant seated in an occupant seat, to cover an upper surface of a vehicle body floor in a liftable and lowerable manner. The movable floor apparatus is characterized by comprising a drive source disposed below the occupant seat, and a driving-force transmission mechanism adapted, according to a driving force of the drive source, to input a force directed in a selected one of frontward and rearward directions of a vehicle body, into a rear portion of the movable board, wherein the movable board is supported in such a manner as to be selectively displaced upwardly and downwardly in response to respective ones of the frontward and rearward forces input from the driving-force transmission mechanism.

BRIEF DESCRIPTION OF THE DRAWINGS

FIGS. 7A and 7B are fragmentary perspective views for explaining an operation of assembling the pallet to the support member, wherein FIG. 7A shows the pallet and the support member in an initial stage of the assembling operation, and FIG. 7B shows the pallet and the support member after completion of the assembling operation.

FIG. 8 is a schematic diagram for explaining a connection structure between a rod of a driving-force transmission mechanism and the movable board, in the movable floor apparatus.

FIGS. 12A and 12B are fragmentary schematic diagrams for explaining an operation of the driving-force transmission mechanism, wherein FIG. 12A shows the driving-force transmission mechanism after the movable board is lowered, and FIG. 12B shows the driving-force transmission mechanism after the movable board is lifted.

DESCRIPTION OF THE PREFERRED EMBODIMENTS

With reference to the drawings, the present invention will now be described based on an preferred embodiment thereof.

First Embodiment

Figure 1:
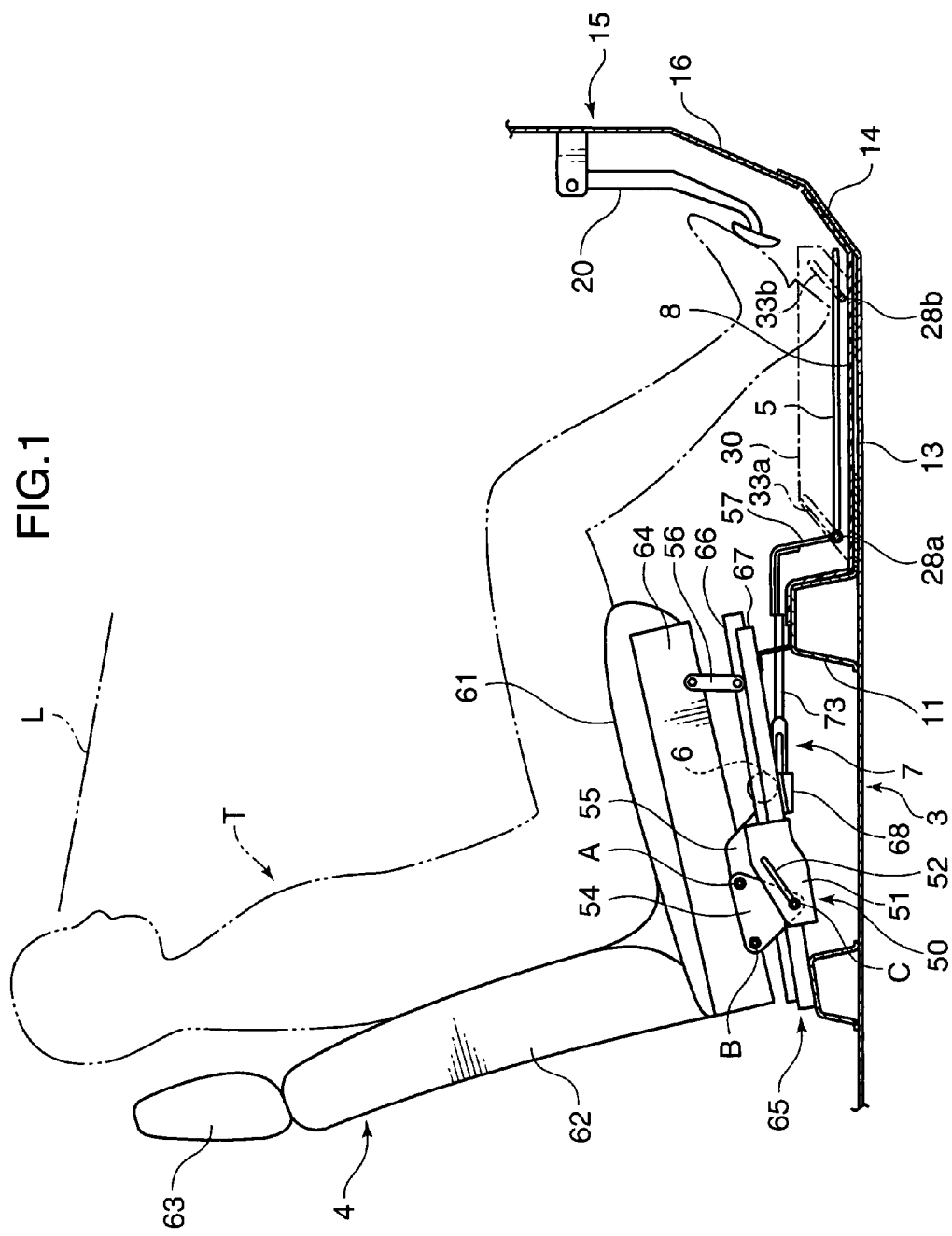
FIG. 1 is a schematic diagram generally showing a movable floor apparatus for a vehicle, according to a first embodiment of the present invention.
Figure 2:
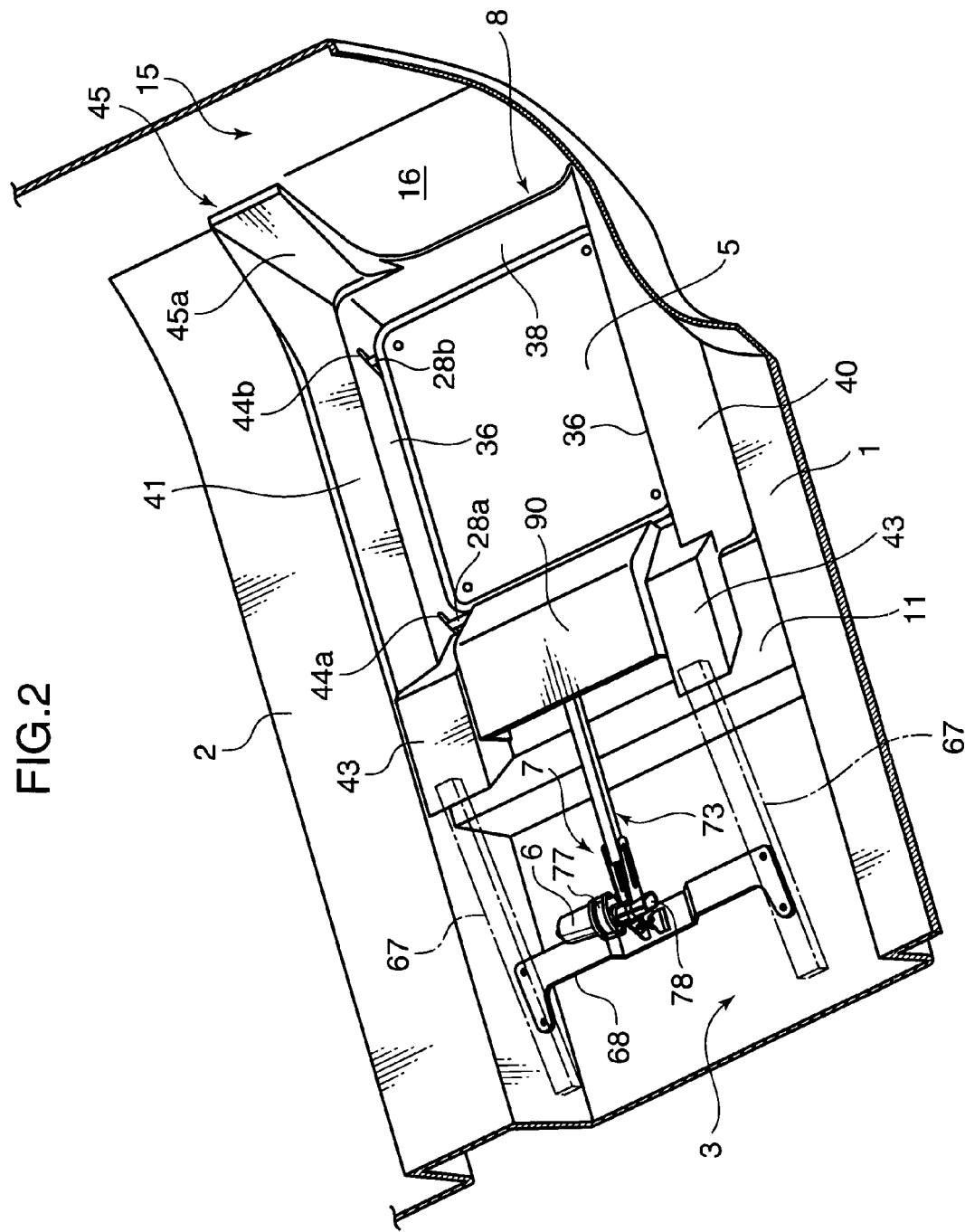
FIG. 2 is a fragmentary perspective view showing the movable floor apparatus.

FIGS. 1 and 2 show a movable floor apparatus according to a first embodiment of the present invention. This movable floor apparatus comprises a movable board 5 which is disposed beneath feet of an occupant seated in an occupant seat 4 (hereinafter referred to occasionally as "seat occupant"), such as a driver seat, to cover an upper surface of a vehicle body floor 3 in a liftable and lowerable manner, an electric motor 6 disposed below the occupant seat 4 to serve as a drive source 6 for selectively lifting and lowering the movable board 5, and a driving-force transmission mechanism 7 adapted to transmit a driving force of the electric motor 6 to the movable board 5.

Figure 3:
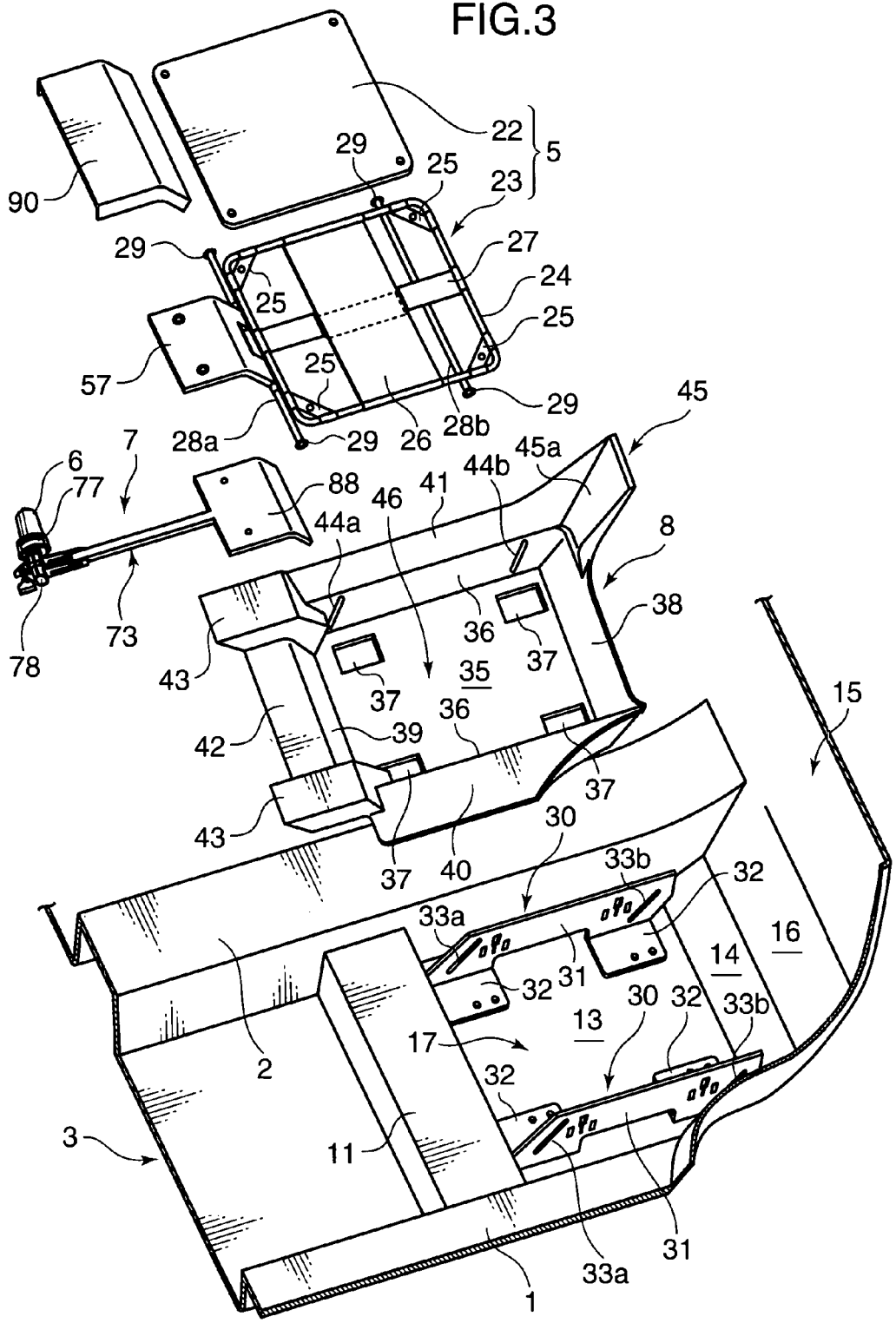
FIG. 3 is an exploded perspective view showing major components of the movable floor apparatus.

As shown in FIGS. 1 to 3, the vehicle body floor 3 comprises an approximately flat panel formed between a side sill 1 extending in a frontward/rearward (i.e., longitudinal) direction of a vehicle body along each of right and left lateral edges of the vehicle body, and a floor tunnel 2 extending in the frontward/rearward direction in a laterally central region of the vehicle body. The vehicle body floor 3 is provided with a cross member 11 which protrudes from an upper surface thereof and extends in a lateral (i.e., width) direction of the vehicle body so as to connect between said side sill 1 and the floor tunnel 2 and support a front end of the occupant seat 4. The movable board 5 is disposed above a front floor portion 13 located frontwardly relative to the cross member 11.

The front floor portion 13 has a front edge continuous with a floor kick-up portion 14 which extends from the front edge obliquely upwardly in the frontward direction of the vehicle body (i.e., with a frontwardly-upward inclination), and has an upper edge joined to a lower edge of a dash panel 15 separating between an engine compartment and an occupant compartment. A foot-operated pedal 20 adapted to be operated by a driver, such as an accelerator pedal or a brake pedal, is disposed above the floor kick-up portion 14. The dash panel 15 has a lower portion formed as a lower inclined portion 16 which extends obliquely downwardly in the rearward direction of the vehicle body (i.e., with a rearwardly-downward inclination). The lower inclined portion 16 and the floor kick-up portion 14 are partially superimposed on each other and joined together by spot-welding or the like.

As shown in FIG. 3, the upper surface of the vehicle body floor 3 is surrounded by respective lateral walls of the side sill 1 and the floor tunnel 2, a front wall of the cross member 11, and the floor kick-up portion 14, so as to define a concave space 17 having a bottom defined by the front floor portion 13. As shown in FIGS. 1 to 5, a pallet 8 having a shape corresponding to the concave shape of the concave space 17 is received in the concave space 17, and the movable board 5 is disposed inside the pallet 8 in a liftable and lowerable manner.

As shown in FIGS. 2 to 5, the pallet 8 is made of a resin material, and formed as a single piece through an integral molding process to have a concave portion 46 for receiving the movable board 5 therein. The pallet 8 has: a bottom wall 35 serving as a bottom of the concave portion 46; opposed right and left lateral walls 36, 36 extending upwardly from respective ones of opposite right and left lateral edges of the bottom wall 35; an inclined front wall 38 extending from a front edge of the bottom wall 35 obliquely upwardly in the frontward direction of the vehicle body (i.e., with a frontward-upward inclination) along the floor kick-up portion 14; a rear wall 39 extending upwardly from a rear edge of the bottom wall 35 along the front wall of the cross member 11; a deck 40 extending from an upper edge of the lateral wall 36 on the side of the side sill 1 approximately horizontally and laterally outwardly; an inclined fence 41 extending from an upper edge of the lateral wall 36 on the side of the floor tunnel 2 obliquely upward and laterally inwardly; a footrest portion 45 which protrudes from a laterally inward region of an front edge of the inclined front wall 38 obliquely upwardly in the frontward direction of the vehicle body, and has a loading surface 45a for allowing a seat occupant to place his/her left foot thereon; a rear extension portion 42 extending from an upper edge of the rear wall 39 in the rearward direction of the vehicle body along an upper surface of the cross member 11; and a pair of right and left raised portions 43, 43 formed in opposite right and left ends of the rear extension portion 42 to protrude upwardly. Each of the deck 40 and the inclined fence 41 is formed and disposed to extend from a corresponding one of the respective upper edges of the right and left lateral walls 36, 36 to a position adjacent to a corresponding one of the respective lateral walls of the side sill 1 and the floor tunnel 2, so as to cover a gap between each of the lateral walls 36, 36 and a corresponding one of the side sill 1 and the floor tunnel 2.

As shown in FIGS. 2 and 3, each of the lateral walls 36, 36 is formed with a pair of rear and front sliding slots 44a, 44b each having a frontwardly-upward inclination, and a pair of rear and front support shafts 28a, 28b (which will be described in detail later) provided in the movable board 5 are supported in such a manner as to protrude outside through respective ones of the sliding slots 44a, 44b.

Specifically, as shown in FIGS. 1 and 3, a pair of right and left support members 30, 30 are provided on the front floor portion 13 at positions located outside the respective lateral walls 36, 36 of the pallet 8, and opposite right and left ends of each of the support shafts 28a, 28b protruding outside through respective ones of the sliding slots 44a, 44b are supported by the right and left support members 30, 30. That is, each of the support members 30, 30 supports the movable board 5 while interposing the lateral wall 36 of the pallet 8 between the movable board 5 and the support member 30.

Figure 4:
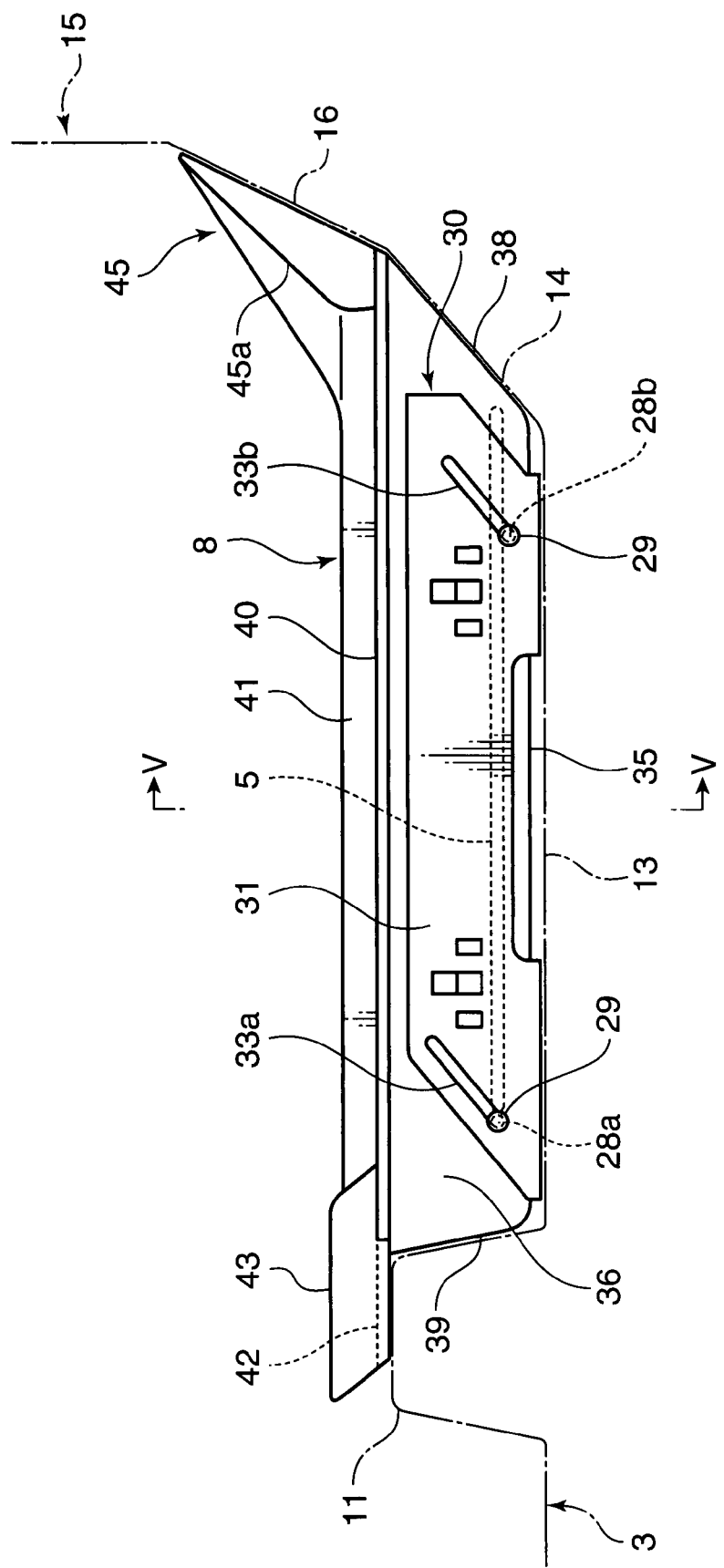
FIG. 4 is a side view primarily showing a configuration of a pallet for receiving a movable board therein, in the movable floor apparatus.
Figure 5:
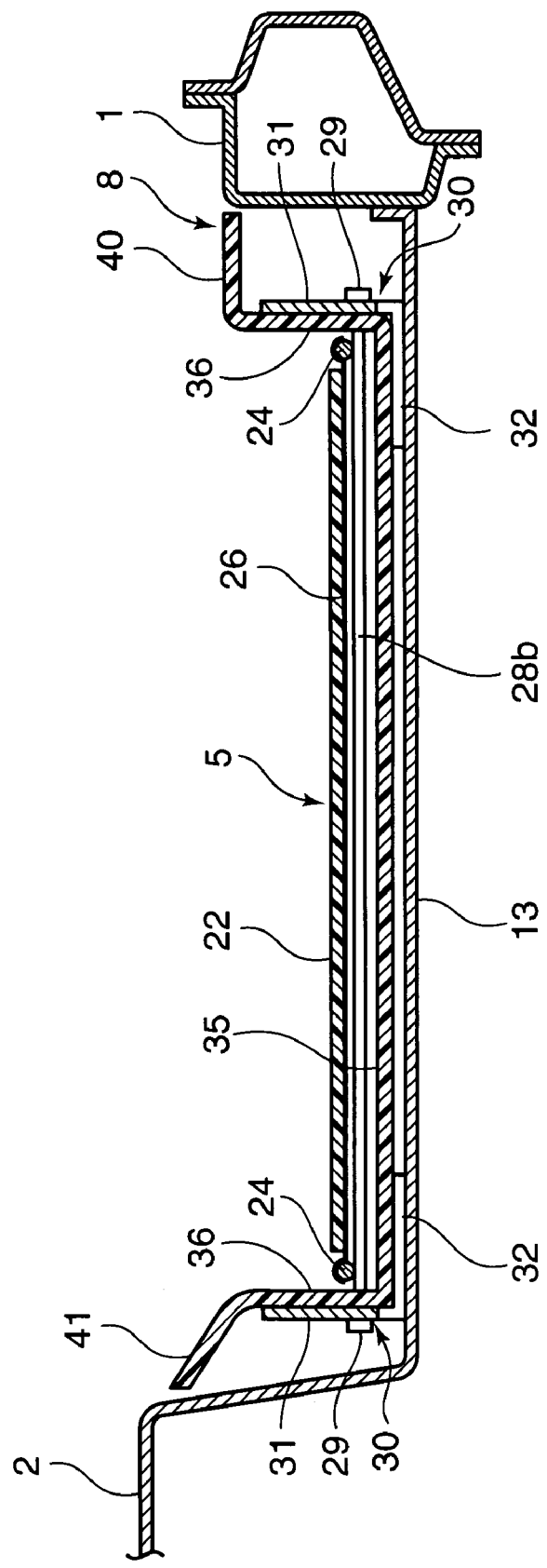
FIG. 5 is a sectional view taken along the line V-V in FIG. 4.

As shown in FIGS. 3 to 5, each of the support members 30, 30 has a standing wall 31 formed and disposed to extend approximately vertically from an upper surface of the front floor portion 13 along a corresponding one of the lateral walls 36, 36 of the pallet 8, and two legs 32, 32 each fixed to the upper surface of the front floor portion 13 with a bolt or the like so as to support the standing wall 31. The standing wall 31 has a pair of rear and front guide grooves 33a, 33b formed in regions corresponding to the respective sliding slots 44a, 44b of the pallet 8, and slidably penetrated by the respective support shafts 28a, 28b of the movable board 5.

In rear and front regions of the standing wall 31, the rear and front guide grooves 33a, 33b are formed to extend obliquely upwardly in the frontward direction of the vehicle body at the same inclination angle. As will be described in detail later, the movable floor apparatus according this embodiment is designed such that, when a force directed in a selected one of the frontward and rearward directions of the vehicle body is input into the movable board 5 having the support shafts 28a, 28b inserted into the respective guide grooves 33a, 33a, 33b, 33b, through the driving-force transmission mechanism 7, the movable board 5 is lifted or lowered while being moved in the frontward or rearward direction along the guide grooves 33a, 33a, 33b, 33b according to the frontward or rearward force. That is, the guide grooves 33a, 33a, 33b, 33b having the forwardly-upward inclination serve as guide means adapted to guide the movable board 5 in such a manner that the movable board 5 receiving either one of the frontward and rearward forces from the driving-force transmission mechanism 7 is lifted or lowered while being moved in the direction of the force.

Figure 6:
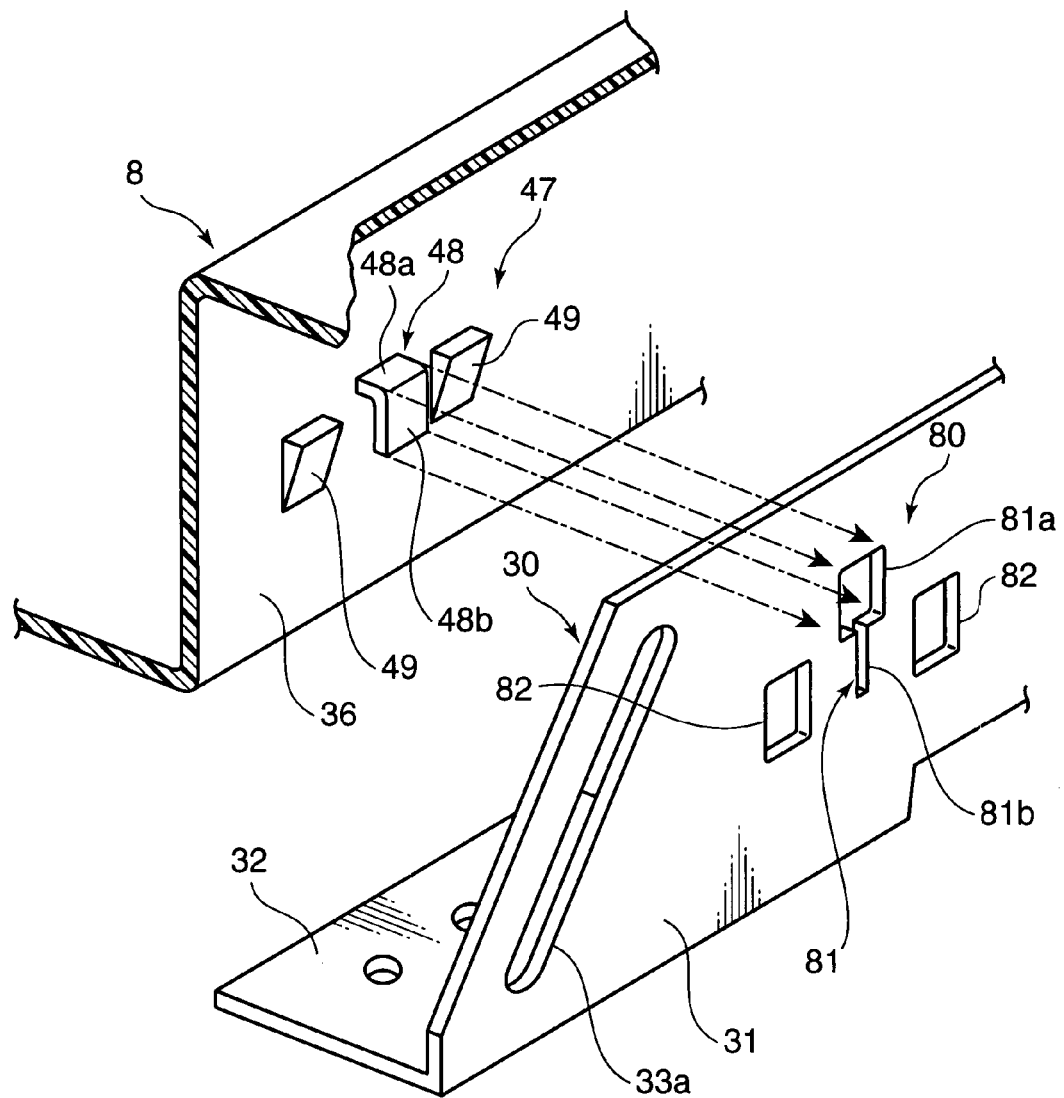
FIG. 6 is an exploded perspective view showing a mounting structure between the pallet and a support member, in the movable floor apparatus.

As shown in FIG. 6, the lateral wall 36 of the pallet 8 has an engagement pawl section 47 which is formed on an outer surface thereof, and adapted to be engaged with an engagement hole section 80 formed in the standing wall 31 of the support member 30. In an engaged state between the engagement pawl section 47 and the engagement hole section 80, the pallet 8 is detachably mounted to the support member 30. The engagement pawl section 47 includes a first engagement pawl 48 formed in an inversed-L shape in front view, and two second engagement pawls 49, 49 each formed in a wedge shape in front view. The first engagement pawl 48 comprises a base portion 48a protruding from the outer surface of the lateral wall 36 of the pallet 8, and a hook portion 48b extending downwardly from a distal end of the base portion 48a. The second engagement pawls 49, 49 are disposed on front and rear sides across the first engagement pawl 48. Correspondingly, the engagement hole section 80 includes a first engagement hole 81 and two second engagement holes 82, 82. The first engagement hole 81 comprises an insertion hole portion 81a having a rectangular shape corresponding to a shape of the first engagement pawl 48 in side view, and a slit portion 81b formed to extend downwardly from a lower peripheral edge of the insertion hole portion 81a and have a width less than that of the insertion hole portion 81a. Each of the second engagement holes 82, 82 has a rectangular shape corresponding to a shape of the second engagement pawl 49 in side view. Further, the hook portion 48b of the first engagement pawl 48 has a protrusion (not shown) which is formed on a back surface thereof to have a width approximately equal to that of the slit portion 81b of the first engagement hole 81, and adapted to be fitted into the slit portion 81b during an operation of assembling the pallet 8 and the support member 30.

The operation of assembling the pallet 8 with the engagement pawl section 47 and the support member 30 with the engagement hole section 80 is performed before the support member 30 is fixed onto the front floor portion 13. Specifically, as shown in FIG. 7A, the insertion hole portion 81a of the first engagement hole 81 of the support member 36 before being fixed onto the front floor portion 13 is aligned with the hook portion 48b of the first engagement pawl 48. In this position, the support member 30 is pressed against the lateral wall 36 of the pallet 36 to elastically deform the lateral wall 36 of the pallet 8 so as to allow the hook portion 48b of the first engagement pawl 48 to be inserted into the insertion hole portion 81a of the first engagement hole 81, and then the pallet 8 is moved downwardly (or the support member 30 is moved upwardly) while keeping the elastic deformation of the pallet 8. Through this operation, as shown in FIG. 7B, the protrusion on the back surface of the hook portion 48b of the first engagement pawl 48 is engaged with an peripheral edge of the slit portion 81b of the first engagement hole 81, and an upper surface of each of the second engagement pawls 49, 49 is engaged with an upper peripheral edge of a corresponding one of the second engagement holes 82, 82, so that a relative movement between the pallet 8 and the support member 30 in the upward/downward (vertical), frontward/rearward (longitudinal), and rightward/leftward (lateral) directions can be restricted.

After the pallet 8 and the support members 30, 30 are assembled together in the above manner, each of the four legs 32, --, 32 of the support members 30, 30 is fixedly fastened onto the upper surface of the front floor portion 13 with a bolt. With a view to facilitating the operation of bolting the legs 32, --, 32, as shown in FIG. 3, a plurality (in this embodiment, four) of operation holes 37, --, 37 each having a predetermined area are formed in four corner regions of the bottom wall 35 of the pallet 8. Specifically, the bottom wall 35 of the pallet 8 is disposed to cover respective upper surfaces of the legs 32, --, 32 and therefore hinders the operation of bolting the legs 32, --, 32 of the support members 30, 30 onto the front floor portion 13. Thus, the operation hole 37 is formed in a region of the bottom wall 35 corresponding to a bolting region in each of the legs 32, --, 32 (position of a bolt hole formed in the leg 32). This allows the operation of bolting the leg 32 to be readily performed through the operation hole 37.

As shown in FIG. 3, the movable board 5 comprises a flat plate-shaped board segment 22 for allowing feet or heels of a seat occupant to be placed thereon, and a base segment 23 for supporting the board segment 22. The base member 23 includes a rectangular-shaped frame member 24, first and second reinforcing plates 26, 27 connecting, respectively, between opposed right and left rods and between opposed front and rear rods, and four connecting fittings 25, --, 25 connecting between adjacent ones of the four rods at four corners of the frame member 24. The board segment 22 is supported by respective upper surfaces of the reinforcing plates 26, 27 and the connecting fittings 25, --, 25.

The frame member 24 is provided with a pair of rear and front support shafts 28a, 28b which are fixed, respectively, to rear and front regions thereof by welding, to extend the lateral direction of the vehicle body. Each of the support shafts 28a, 28b is formed and fixed in such a manner that the right and left ends thereof protrude outside respective ones of the right and left rods of the frame member 24. These protruding portions (i.e., the right and left ends of the support shafts 28a, 28b) are inserted into the respective guide grooves 33a, 33a, 33b, 33b in each of the support members 30, 30, to allow the support shafts 28a, 28b to be supported by the support members 30, 30. After the support shafts 28a, 28b are inserted into the guide grooves 33a, 33a, 33b, 33b, a detachable speed nut 29 is attached to each of the ends of the support shafts 28a, 28b in such a manner as to come into contact with a peripheral edge of a corresponding one of the guide grooves 33a, 33a, 33b, 33b on an outer surface of the standing wall 31, so as to restrict a lateral movement of each of the support shafts 28a, 28b.

Figure 9:
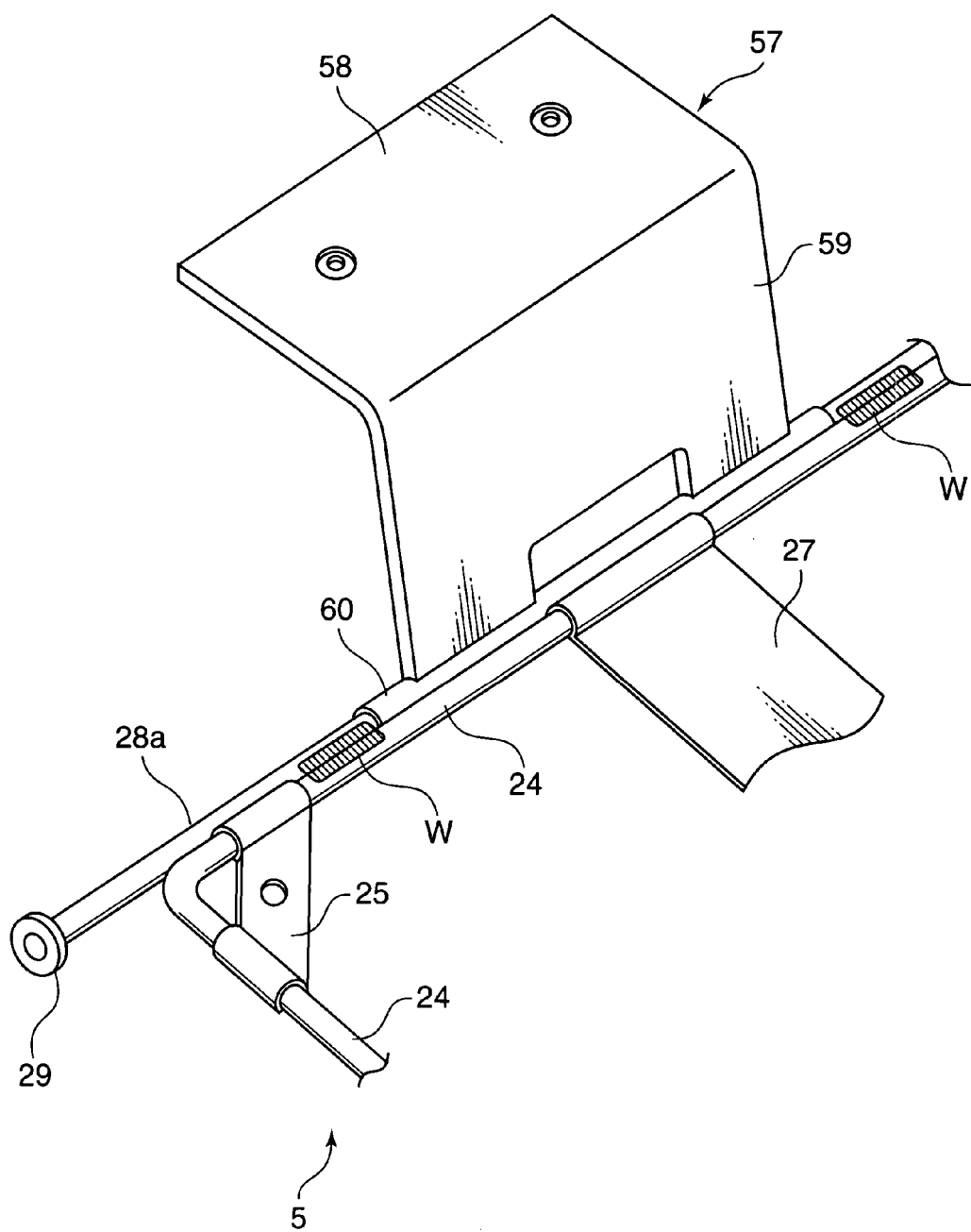
FIG. 9 is a perspective view for explaining the connection structure.

As shown in FIGS. 1 to 3, the movable board 5 is connected to the driving-force transmission mechanism 7 through a connection member 57 formed in an inversed-L shape in side view, which extends above and across the cross member 11 and then extends downwardly. As shown in FIGS. 8 and 9, the connection member 57 has a horizontal wall 58 extending horizontally to cover the upper surface of cross member 11, a vertical wall 59 extending downwardly from a front edge of the horizontal wall 58 along the front wall of the cross member 11, and a tubular-shaped boss 60 fixed to an lower edge of the vertical wall 59 and rotatably penetrated by the rear support shaft 28a. Thus, the connection member 57 connects between the movable board 5 and the driving-force transmission mechanism 7 in such a manner as to be rotatable about the rear support shaft 28a inserted into the boss 60. In FIG. 9, the hatched region W indicates a weld bead. That is, the rear support shaft 28a and the rear rod of the frame member 24 are disposed parallel to each other, and joined together through the weld bead W. The boss 60 of the connection member 57 is not welded to the frame member 24 to allow the boss 60 to be freely rotated relative to the rear support shaft 28a. The movable board 5 and the connection member 57 are pre-assembled together with the pallet 8 and the support members 30, elsewhere than the vehicle, and then disposed on the front floor portion 13 as the assembly.

As shown in FIGS. 2 and 3, in order to hide the above connection area, a cover member 90 is disposed above the connection member 57 connecting between the movable board 5 and the driving-force transmission mechanism 7. The cover member 90 is positioned between the right and left raised portions 43, 43 formed in the respective right and left ends of the rear extension portion 42 of the pallet 8, so as to fill a space between the raised portions 43, 43.

As shown in FIG. 1, the occupant seat 4 is a separate seat, i.e., a driver seat and a front passenger seat are formed as independent seats. The occupant seat 4 comprises a seat cushion 61 defining a seating surface for an occupant, a seatback 62 extending upwardly from a rear end of the seat cushion 61, and a headrest 63 attached to an upper end of the seatback 62. The seat cushion 61 includes a cushion frame 64 supporting a seat-cushion body (cushioning material) from below, and a seat slide rail 65 is disposed below the cushion frame 64 to extend in the frontward/rearward direction of the vehicle body. The occupant seat 4 is supported relative to the vehicle body floor 3 through the seat slide rail 65 in a frontwardly/rearwardly movable manner.

The seat slide rail 65 comprises a pair of right and left lower rails 67, 67 each formed of a sectionally C-shaped member and fixed relative to the vehicle body with a frontwardly-upward inclination, and a pair of right and left upper rails 66, 66 slidably supported along respective ones of the lower rails 67, 67. When the upper rails 66, 66 are displaced relative to the lower rails 67, 67, the occupant seat 4 is moved in the frontward/rearward direction.

The occupant seat 4 includes a tilt mechanism 50 disposed in a rear region of the seat slide rail 65 and adapted to selectively lift and lower a rear end of the occupant seat 4. The tilt mechanism 50 comprises a rear link member 54 coupling between the rear end of the cushion frame 64 and the seat slide rail 65, and a support plate 51 fixed to a rear region of the lower rail 67 to slidably support the rear link member 54. The occupant seat 4 further includes a front link member 56 having opposite ends pivotally supported by the upper rail 66 and the cushion frame 64, respectively. Each of the tilt mechanism 50 and the front link member 56 is symmetrically provided on right and left sides of the occupant seat 4.

The rear link member 54 is a plate-shaped member formed in an approximately triangular shape in side view, and three apex points A, B, C of the rear link member 54 are pivotally supported by a protruding plate 55 provided on the upper rail 66 to protrude upwardly therefrom, a rear end region of the cushion frame 64, and the support plate 51, respectively. The support plate 51 is formed with a sliding groove 52 inclined obliquely upwardly and frontwardly at an inclination angle greater than that of the seat slide rail 65. The apex point C in a lower region of the rear rink member 54 is slidably supported along the sliding groove 52. Thus, when the occupant seat 4 is moved in the frontward/rearward direction, the rear link member 54 is swingingly displaced about a pivoted point relative to the protruding plate 55 of the upper rail 66 (i.e., about the apex point A), so as to lift/lower a rear end of the cushion frame 64.

Figure 13:
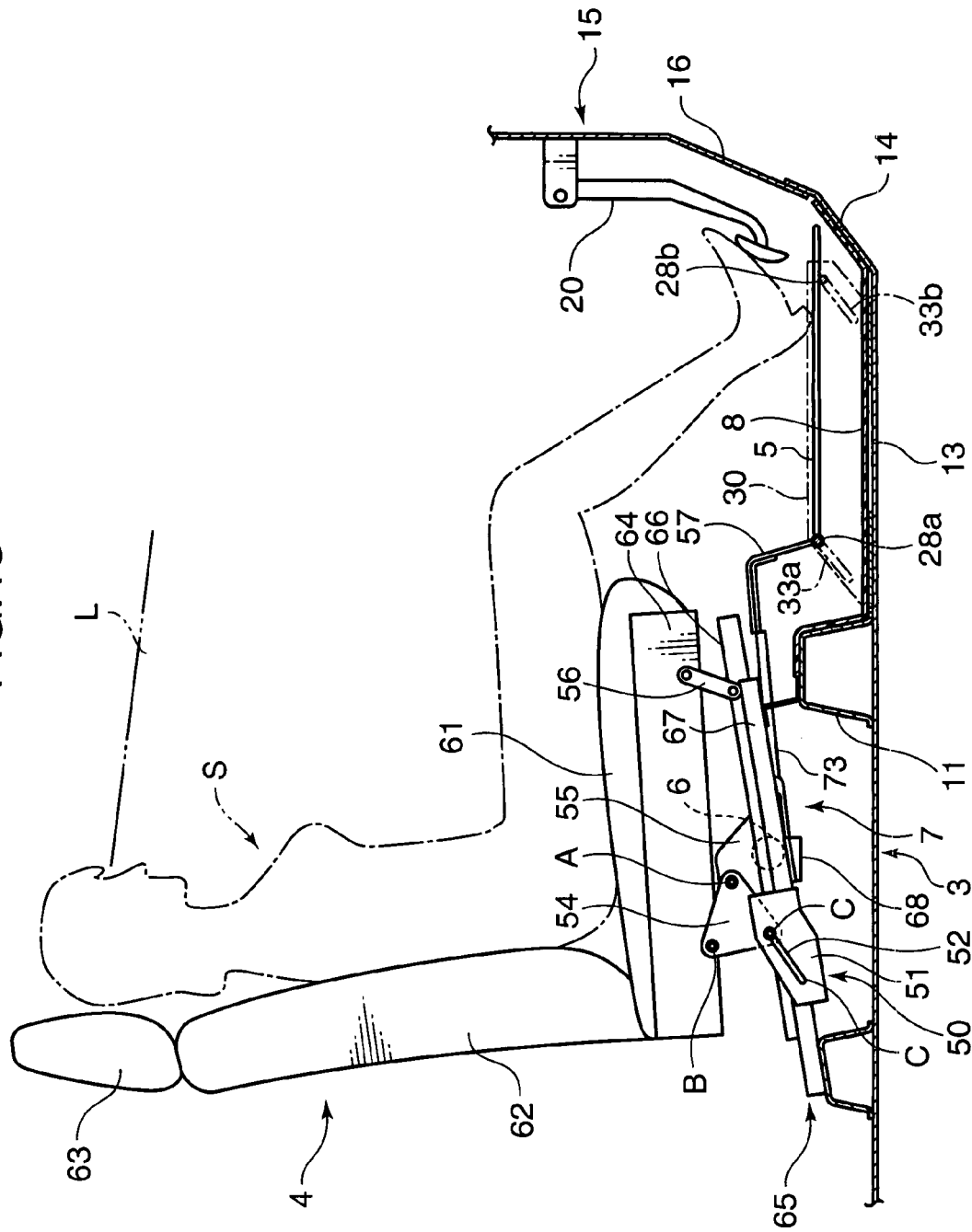
FIG. 13 is a schematic diagram showing a state after an occupant seat is moved frontwardly, and the movable board is lifted.

For example, when the cushion frame 64 of the occupant seat 4 is moved from a rearmost position illustrated in FIG. 1 to a frontmost position illustrated in FIG. 13 along the seat slide rail 65, the apex point C of the rear link member 54 supported by the support plate 51 is moved obliquely upwardly at a steep angle along the sliding groove 52, and the apex point A pivotally supported by the protruding plate 55 of the upper rail 66 is moved obliquely upwardly at a lower angle along the inclination angle of the upper rail 66. Thus, the rear link member 54 is swingingly displaced to allow the apex point B, i.e., a pivoted point relative to the cushion frame 64, to be displaced upwardly about the apex point A. According to this displacement, as shown in FIG. 13, the rear end of the cushion frame 64 will be pushed upwardly by a predetermined distance.

The above occupant seat 4 is provided, but not shown, with a seat-driving motor, in addition to the electric motor 6 for selectively lifting and lowering the movable board 5, and a slide drive mechanism adapted to transmit a driving force of the seat-driving motor to the upper rail 66 so as to drivingly move the upper rail 66 in the frontward/rearward direction. Thus, in response to a selected one of positive and negative rotations of the seat-driving motor, the cushion frame 64 will be moved frontwardly or rearwardly along the lower rail 67, and the rear end of the cushion frame 64 will be pushed upwardly by the tilt mechanism 50 comprising the rear link member 54.

For example, given that a short occupant S seated in the occupant seat 4 operates a control switch (not shown) to rotate the seat-driving motor in a positive direction so as to slidingly displace the occupant seat 4 in the frontward direction of the vehicle body. In this case, a front end of the seat cushion 61 is lifted along the lower rail 67, and the rear end of the seat cushion 61 is pushed upwardly, as shown in FIG. 13. Thus, a hip point corresponding to a position of a hip joint of the occupant S seated in the seat cushion 61 is moved frontwardly and upwardly in conformity to the body height of the occupant S, so as to allow a visual line of the occupant S to conform to an optimum line L. In addition, the rear end of the seat cushion 61 is pushed upwardly according to the frontward movement of the occupant seat 4 to allow an angular position of the seat cushion 61 to come closer to an approximately horizontal position. Thus, the short occupant S having relatively short legs can have a seating posture where his/her knees are largely bent and below-knee regions are stretched downwardly at a certain angle, so as to prevent his/her feet from being spaced apart from the vehicle body floor.

As another example, given that a tall occupant T seated in the occupant seat 4 operates the control switch to rotate the seat-driving motor in a negative direction so as to slidingly displace the occupant seat 4 in the rearward direction of the vehicle body. In this case, the front end of the seat cushion 61 is lowered along the lower rail 67, and the rear end of the seat cushion 61 is pushed downwardly, as shown in FIG. 1. Thus, the hip point corresponding to a position of a hip joint of the occupant T seated in the seat cushion 61 is moved rearwardly and downwardly in conformity to the body height of the occupant T, so as to allow a visual line of the occupant T to conform to the optimum line L. In addition, the seat cushion 61 has a frontwardly-upward inclination according to the rearward movement of the occupant seat 4 to allow the tall occupant T having relatively long legs to have a seating posture where a bending angle of his/her knees is reduced to stretch below-knee regions frontwardly, so as to avoid a cramped seating posture.

Figure 10:
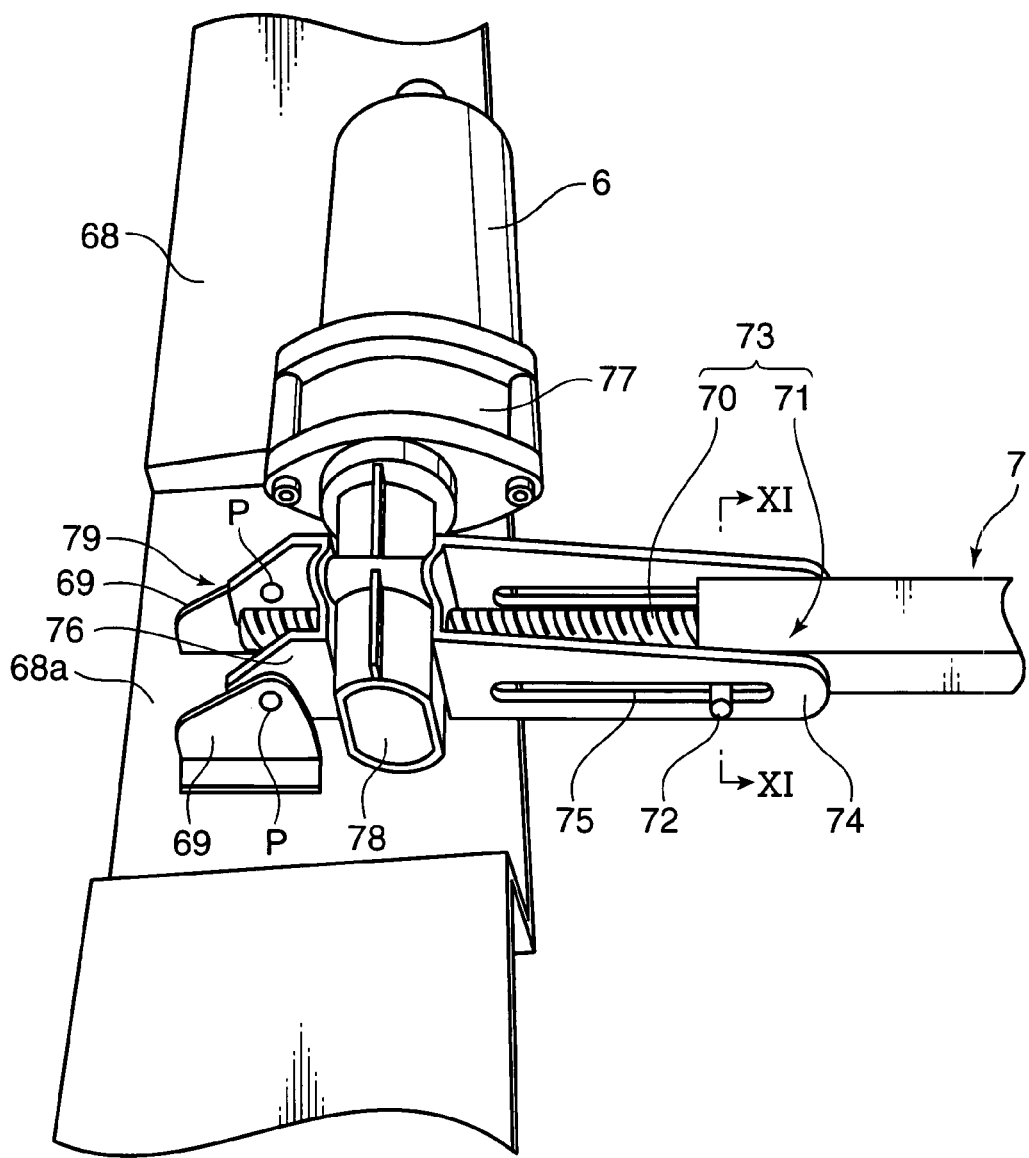
FIG. 10 is a perspective view showing a specific structure of the driving-force transmission mechanism.

As shown in FIGS. 1 and 2, the movable floor apparatus includes a lateral member 68 which extends in the lateral direction of the vehicle body to connect between respective lower surfaces of the right and left lower rails 67, 67 of the occupant seat 4, and support thereon a rear end of the driving-force transmission mechanism 7 adapted to transmit a driving force of the electric motor 6 to the movable board 5. FIG. 10 shows a structure for supporting the rear end of the driving-force transmission mechanism 7. As shown in FIG. 10, the lateral member 68 has a laterally approximately central portion formed as a concaved portion 68a which is concaved downwardly relative to the remaining portion by a predetermined distance. A swing support mechanism 79 is provided on the concaved portion 68a, and the driving-force transmission mechanism 7 is swingably supported relative to the lateral member 68 through the swing support mechanism 79.

The swing support mechanism 79 comprises a pair of right and left fixed plates 69, 69 each fixedly mounted on the concaved portion 68a of the lateral member 68 to stand upright, and a swingable bracket 76 which is formed in an inversed angled-C shape in top plan view to have right and left lateral walls pivotally supported by the right and left fixed plates 69, 69 through right and left pivots P, P, respectively. The swingable bracket 76 has a front end surface which is fixedly fastened to a rear surface of a second gear box 78 (which will be described in detail later) of the driving-force transmission mechanism 7, to allow the driving-force transmission mechanism 7 to be swingably supported relative to the lateral member 68.

As shown in FIGS. 1 to 3 and 10, the driving-force transmission mechanism 7 includes a rod 73 which extends in the frontward/rearward direction of the vehicle body, and has a front end connected to a rear end of the movable board 5 through the connection member 57, and first and second gear boxes 77, 78 adapted to interlockingly connect between the rod 73 and an output shaft of the electric motor 6. As shown in FIG. 10, the driving-force transmission mechanism 7 also includes a guide bracket 74 fixedly fastened to a front surface of the second gear box 78. The guide bracket 74 is formed in an axially-long angled-C shape in top plan view to have right and left lateral walls each formed with a guide groove 75 for guiding the rod 73 (this guide groove 75 will hereinafter be referred to as "rod guide groove 75").

Figure 11:
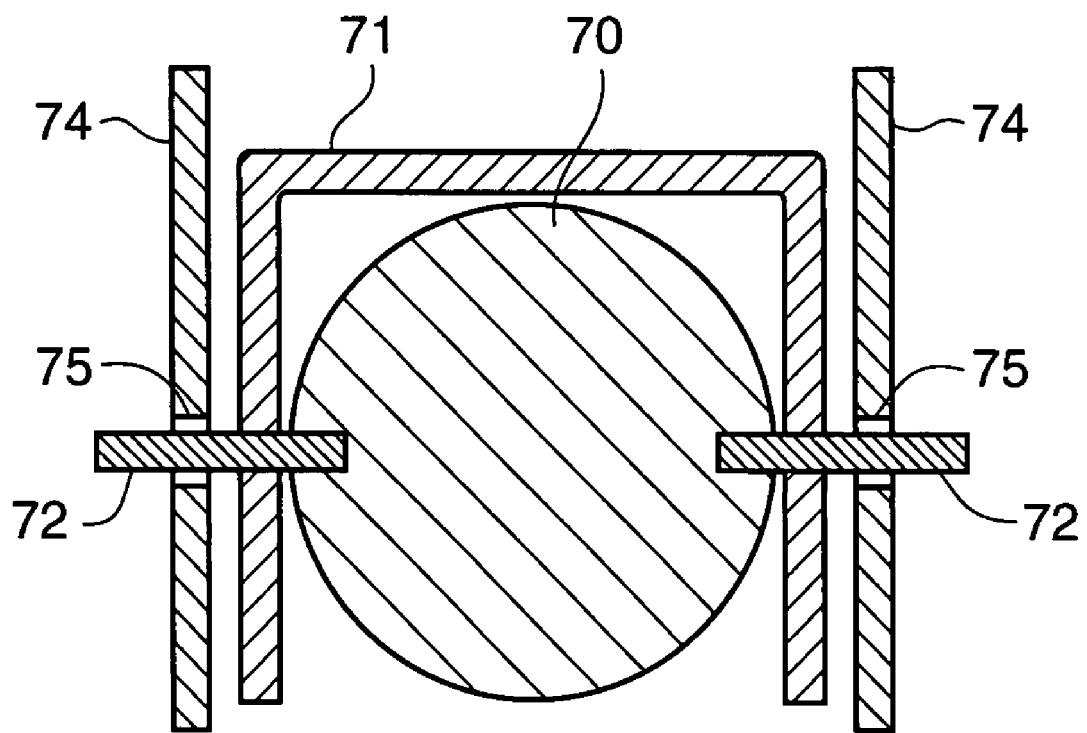
FIG. 11 is a sectional view taken along the line XI-XI in FIG. 10.

The rod 73 comprises a screw shaft 70 adapted to be selectively moved frontwardly and rearwardly according to a screw feed based on a worm nut 87 (which will be described in detail later; see FIGS. 12A and 12B) in the second gear box 78, and an extension rod 71 connected to a front end of the screw shaft 70 through a pair of right and left fastening pins 72, 72. FIG. 11 shows a section taken along the line XI-XI in FIG. 10. As shown in FIG. 11, the extension rod 71 is formed in a sectionally angled-C shape with an open bottom, and connected to the front end of the screw shaft 70 housed in the angled-C shaped extension rod 71, through the right and left fastening pins 72, 72. Specifically, the fastening pins 72, 72 fixed to the extension rod 70 to penetrate through respective ones of right and left lateral walls of the extension rod 70 are fitted into respective ones of two holes formed in right and left regions of an outer peripheral surface of the screw shaft 70, so that the extension rod 71 and the screw shaft 70 are connected to each other through the fastening pins 72, 72.

As shown in FIG. 3, the extension rod 71 has a front end formed as a connection member-conformable portion 88 having a relatively wide area corresponding to that of the connection member 57. As shown in FIGS. 1 and 8, the connection member-conformable portion 88 is superimposed on a lower surface of the connection member 57, and then fastened by a fixing screw or the like. In this manner, the connection rod 71 is connected to the rear end of the movable board 5 through the connection member 57.

The first gear box 77 is internally provided, but not shown, with a speed-reduction gear mechanism comprising a plurality of pinion gears, and adapted to reduce a rotational speed of the output shaft of the electric motor 6 through the speed-reduction gear mechanism and transmit the obtained driving force to the second gear box 78. As shown in FIG. 12, the second gear box 78 internally has a worm shaft 86 fixed to a shaft 85 extending from an output section of the first gear box 77, so as to be rotated together with the shaft 85, and a tubular-shaped worm nut 87 meshed with the worm shaft 86 in such a manner as to have an rotational axis extending in a direction orthogonal to that of the worm shaft 86. The screw shaft 70 of the rod 73 is coaxially disposed to penetrate through the worm nut 87 in such a manner that an external thread of the screw shaft 70 is engaged with an internal thread formed on an inner peripheral surface of the worm nut 87. Thus, when the worm nut 87 is rotationally driven by the worm shaft 86, the screw shaft 70 threadedly engaged with the worm nut 87 will be selectively moved frontwardly and rearwardly according to a screw feed.

When the screw shaft 70 is screw-fed in the above manner, a force directed in a selected one of the frontward and rearward directions of the vehicle body will be input into the rear end of the movable board 5 through the rod 73 comprising the screw shaft 70 and the extension rod 71. Then, according to the frontward or rearward force, the movable board 5 will be displaced upwardly or rearwardly while being guided along the guide grooves 33a, 33a, 33b, 33b formed in the right and left support members 30, 30.

For example, when the movable board 5 is located in a lowermost height position illustrated in FIGS. 1 and 8, and the electric motor 6 is activated to rotate in the positive direction, the screw shaft 70 will be screw-fed frontwardly to thereby input a force directed in the frontward direction of the vehicle body, into the rear end of the movable board 5. Thus, the support shafts 28a, 28b of the movable board 5 will be moved obliquely upwardly along the guide grooves 33a, 33a, 33b, 33b, to thereby displace the movable board 5 to an uppermost height position illustrated in FIG. 13. As mentioned above, the inclination angle of the rear and front guide grooves 33a, 33b guiding the respective ones of the support shafts 28a, 28b are set at the same value. Thus, during the above operation, the movable board 5 can be lifted along the guide grooves 33a, 33a, 33b, 33b while keeping a posture thereof approximately horizontal. Then, when the movable board 5 is in the uppermost height position, and the electric motor 6 is activated to rotate in the negative direction, the screw shaft 70 will be screw-fed rearwardly to thereby input a force directed in the rearward direction of the vehicle body, into the rear end of the movable board 5. Thus, the support shafts 28a, 28b of the movable board 5 will be moved obliquely downwardly along the guide grooves 33a, 33a, 33b, 33b, to thereby displace the movable board 5 to the lowermost height position illustrated in FIG. 1.

As can be understood from comparison between FIG. 1 and FIG. 13, in side view, an angular position of the rod 73 connected to the rear end of the movable board 5 through the connection member 57 is changed within a predetermined angular range according to the upward/downward displacement of the movable board 5. For example, when the movable board 5 is in the lowermost height position illustrated in FIG. 1, the rod 73 has a posture where it extends in an approximately horizontal direction. When the movable board 5 is displaced from the lowermost height position to the uppermost height position illustrated in FIG. 13, and thereby the front end of the rod 73 connected to the movable board 5 is raised upwardly, the rod 73 will be inclined obliquely upwardly and frontwardly (i.e., have a frontwardly-upward inclination). In this manner, the angular position of the rod 73 in side view is changed. In connection with the change in angular position, the swing support mechanism 79 supporting the rear end of the driving-force transmission mechanism 7 including the rod 73 is designed to support the driving-force transmission mechanism 7 while permitting the change in angular position of the rod 73, as shown in FIGS. 12A and 12B. Specifically, even if the rod 73 receives a force causing the forwardly-upward inclination due to the lifting of the movable board 5, the swingable bracket 76 of the swing support mechanism 79 can be swingingly displaced relative to the fixed plate 69 about the pivots P, P so as to permit the change in angular position of the rod 73. Further, as mentioned above, the movable board 5 is displaced upwardly or downwardly according to the driving force input from the rod 73, while maintaining the approximately horizontal posture.

Thus, the angular position of the rod 73 relative to the movable board 5 is changed only by an angle of the forwardly-upward inclination. This relative angular change between the rod 73 and the movable board 5 can be absorbed by the afore-mentioned structure designed such that the connection member 57 connecting between the rod 73 and the movable board 5 is rotationally displaced about the rear support shaft 28a as a connection point between the connection member 57 and the movable board 5. That is, the rear support shaft 28a and the boss 60 of the connection member 57 rotatably penetrated by the rear support shaft 28a serve as a flexion permitting portion for permitting the change in angular position of the rod 73 relative to the movable board 5.

The above movable board 5 adapted to be driven through the driving-force transmission mechanism 7 in a liftable and lowerable manner is displaced upwardly or downwardly in conjunction with a selected one of the frontward and rearward movements of the occupant seat 4. Specifically, the electric motor 6 for driving the movable board 5 is designed to be activated in conjunction with an occupant's operation of a control switch (not shown) for moving the occupant seat 4 in the frontward/rearward direction, or the frontward/rearward movement of the occupant seat 4. Thus, a driving force of the electric motor 6 is transmitted to the movable board 5 through the driving-force transmission mechanism 7 so as to selectively displace the movable board 5 upwardly and downwardly. For example, given that a short occupant S seated in the occupant seat 4 operates a control switch (not shown) to move the occupant seat 4 in the frontward direction of the vehicle body. In this case, in conjunction with the operation of the control switch or the frontward movement of the occupant seat 4, the electric motor 6 is activated to rotate in the positive direction so as to move the rod 73 of the driving-force transmission mechanism 7 frontwardly, and thereby the movable board 5 is displaced to the uppermost height position illustrated in FIG. 13. As another example, given that a tall occupant T seated in the occupant seat 4 operates the control switch to move the occupant seat 4 in the rearward direction of the vehicle body. In this case, in conjunction with the operation of the control switch or the rearward movement of the occupant seat 4, the electric motor 6 is activated to rotate in the negative direction so as to move the rod 73 of the driving-force transmission mechanism 7 rearwardly, and thereby the movable board 5 is displaced to the lowermost height position illustrated in FIG. 1. In this manner, the movable board 5 is displaced upwardly or downwardly in conjunction with a selected one of the frontward and rearward movements of the occupant seat 4, so that the movable board 5 for allowing feet or heels of a seat occupant to be placed thereon can be adjustably set at a height position suitable for a length of legs of each of the short and tall occupants S, T.

As described above, the movable floor apparatus according to the first embodiment is designed such that a force directed in a selected one of the frontward and rearward directions of the vehicle body is input into the rear end of the movable board 5 disposed beneath feet of an occupant seated in the occupant seat 4, through the driving-force transmission mechanism 7, so as to displace the movable board 5 upwardly or downwardly according to the selected frontward or rearward force. Thus, as compared with the movable floor apparatus disclosed in the Patent Publication 1 where the lifting/lowering drive linkage is disposed below the movable board, the movable floor apparatus according to the first embodiment has an advantage of being able to selectively displace the movable board 5 upwardly and downwardly without installing any particular mechanism below the movable board 5, so as to allow the lowermost height position of the movable board 5 to be set at a lower level. This movable board 5 adapted to be set at a lower lowermost height position makes it possible to advantageously achieve a movable floor apparatus capable of coping with various seating postures with enhanced flexibility.

Specifically, the movable floor apparatus according to the first embodiment is designed such that the support shafts 28a, 28b of the movable board 5 are slidably supported by the guide grooves 33a, 33a, 33b, 33b formed in the support members 30, 30, and the rod 73 of the driving-force transmission mechanism 7 adapted to selectively moved frontwardly and rearwardly according to the operation of the electric motor 6 is connected to the rear end of the movable board 5 through the connection member 57, whereby, when a force directed in a selected one of the frontward and rearward directions of the vehicle body is input into the rear end of the movable board 5 in response to the frontward or rearward movement of the rod 73, the movable board 5 is displaced upwardly or downwardly while being guided along the guide grooves 33a, 33a, 33b, 33b. Thus, the movable board 5 can be selectively displaced upwardly and downwardly without installing any particular mechanism, such as a lifting/lowering drive linkage, below the movable board 5, to allow the lowermost height position of the movable board 5 to be set at a lower level. This makes it possible to allow a seat occupant to flexibly select a desired one of various seating postures depending on the occupant's physique, while effectively preventing a seat occupant with a particularly large body size, such as a tall occupant, from having a cramped seating posture.

In the first embodiment, the pair of support members 30, 30 are provided, respectively, on the right and left sides of the movable board 5, and the support shafts 28a, 28b of the movable board 5 are slidably supported by the respective guide grooves 33a, 33a, 33b, 33b formed in the support members 30, 30. This provides an advantage of being able to support the movable board 5 by a simple and compact structure, and selectively displace the movable board 5 upwardly and downwardly while guiding the movable board 5 along the guide grooves 33a, 33a, 33b, 33b, in a stable and reliable manner. In addition, the guide grooves 33a, 33a, 33b, 33b are provided as guide means to guide the upward/downward movement of the movable board 5. This provides an advantage of being able to allow the upward/downward movement of the movable board 5 to be reliably guided by a simple structure designed such that the opposite ends of the support shafts 28a, 28b are supportedly inserted into the respective guide grooves 33a, 33a, 33b, 33b.

In the first embodiment, the occupant seat 4 includes therebelow the pair of right and left lower rails 67, 67 fixed relative to the vehicle body, and the pair of right and left upper rails 66, 67 slidably supported by respective ones of the right and left lower rails 67, 67, and the lateral member 68 is disposed to connect between the right and left lower rails 67, 67, and support the driving-force transmission mechanism 7. This provides an advantage of being able to ensure relatively high mounting stiffness for the driving-force transmission mechanism 7, and efficiently lay out the driving-force transmission mechanism 7 through effective utilization of a dead space below the occupant seat 4.

In the first embodiment, the driving-force transmission mechanism 7 comprises the rod 73 which extends in the frontward/rearward direction of the vehicle body and has the front end connected to the rear end of the movable board 5 through the connection member 57, and the first and second gear boxes 77, 78 adapted to interlockingly connect between the rod 73 and the output shaft of the electric motor 6, so as to input a force oriented in a selected one of the frontward and rearward directions of the vehicle body, into the rear end of the movable board 5 in response to a frontward or rearward movement of the rod 73. This provides an advantage of being able to reliably transmit a driving force of the electric motor 6 to the movable board 5 by a simple structure having low transmission loss.

In the first embodiment, the connection member 57 formed and disposed to extend across and above the cross member 11 protruding upwardly from the vehicle body floor 3 and then extend downwardly is interposed between the rod 73 and the movable board 5. This provides an advantage of being able to connect the rod 73 and the movable board 5 while avoiding interference with an existing structural member, such as the cross member 11, so as to transmit a driving force of the electric motor 6 to the movable board 5, in a simple and economic structure without modifying the existing structural member.

Although the rod 73 may be directly connected to the movable board 5, for example, by allowing the rod 73 to penetrate through the cross member 11, such a structure essentially involves a significant modification, such as formation of a through-hole in the cross member 11, which causes a problem about increase in cost. By contrast, the above structure in the first embodiment can advantageously connect the rod and the movable board 5 to transmit a driving force of the electric motor 6 to the movable board 5 in a simplified manner and with enhanced cost performance.

In the first embodiment, the driving-force transmission mechanism 7 is supported by the swing support mechanism 79 adapted to permit a change in angular position of the rod 73 in side view. This provides an advantage of being able to transmit a driving force to the movable board 5 which is being displaced upwardly or downwardly, in a simple and economic structure without the need for changing a height position of a support/pivot point of the driving-force transmission mechanism 7 in response to the upward/downward movement of the movable board 5.

Specifically, although the support structure of the driving-force transmission mechanism 7 may be designed such that, when the front end of the rod 73 connected to the rear end of the movable board 5 through the connection member 57 is moved upwardly or downwardly due to the upward or downward movement of the movable board 5, a height position of a support/pivot point of the driving-force transmission mechanism 7 is changed in conformity to the movement of the front end of the rod 73, a complicated mechanism is required to change the height position of the support/pivot point to cause a problem about increases in size and cost of the apparatus. By contrast, in the first embodiment, the swing support mechanism 79 comprising the fixed plate 69 and the swingable bracket 76 pivotally supported by the fixed plate 69 is designed to support the driving-force transmission mechanism 7 in such a manner as to permit a change in angular position of the rod 73 in side view. This provides an advantage of being able to maintain the connection between the rod 73 and the movable board 5 in a simple structure without the need for changing the height position of the support/pivot point of the driving-force transmission mechanism 7, and transmit a driving force of the electric motor 6 to the movable board 5 which is being displaced upwardly or downwardly, with enhanced cost performance.

In the first embodiment, the rear support shaft 28a of the movable board 5 and the boss 60 of the connection member 57 rotatably penetrated by the rear support shaft 28a serve as a flexion permitting portion for permitting the change in angular position of the rod 73 relative to the movable board 5 in side view. When the rod 73 is connected to the movable board through the flexion permitting portion, the movable board 5 can be maintained in a constant angular position regardless of the change in angular position of the rod 73. For example, the movable board 5 can be displaced upwardly and downwardly while keeping the movable board 5 in a horizontal posture.

In the first embodiment, the vehicle body floor 3 is provided with the side sill 1, the floor tunnel 2 and the cross member 11 which protrude upwardly therefrom to surroundingly define the concave space 17. The pallet 8 having a shape corresponding to that of the concave space 17 is mounted in the concave space 17, and the movable board 5 disposed to allow a seat occupant to place his/her feet thereon, in a liftable and lowerable manner, is installed in the pallet 8. Thus, the movable board 5 can be displaced upwardly and downwardly in an internal space of the pallet 8 separated from vehicle body-side members, such as the side sill 1 and the floor tunnel 2. This makes it possible to effectively prevent a structural element, such as a protrusion and a step, of the vehicle body-side members, from hindering the upward/downward movement of the movable board 5, so as to allow the movable board 5 to be smoothly displaced upwardly and downwardly. In addition, the pallet 8 receiving the movable board 5 therein can be readily formed to have a shape for reducing a gap between the movable board 5 and an inner wall surface of the pallet 8, such as an inner surface of the lateral wall 36, so as to effectively provide enhanced appearance of a floor zone located beneath feet of a seat occupant, and effectively prevent foreign substances, such as dusts, from getting into the internal space of the pallet 8 through the gap.

In addition, the movable board 5 is displaced upwardly and downwardly inside the pallet 8 which is a separate component from the vehicle body floor 3. This allows the occupant to readily recognize a lifting/lowering area of the movable board 5 so as to effectively prevent the occupant from feeling strange due to a movement of the movable board 5 different from what the occupant expected. Further, after pre-assembling the components, such as the board segment 22 and the frame member 24, of the movable board 5, together, attaching the pre-assembled movable board 5 to the internal space of the pallet 8, and attaching the support members 30, 30 to the pallet 8, elsewhere than the vehicle, the pallet 8 is mounted on the front floor portion 13 (in the concave space) through the support members 30, 30. This makes it possible to readily set the movable board 5 above the front floor portion 13 so as to effectively provide enhanced efficiency of the assembling operation for the movable board 5.

In the first embodiment, the right and left lateral walls 36, 36 of the pallet 8 are formed to extend approximately vertically upwardly, and the movable board 5 is designed to be displaced approximately vertically inside the pallet 8 in such a manner that each of the right and left edges thereof has a movement locus along a corresponding one of the right and left lateral walls 36, 36 of the pallet 8. Thus, a gap between each of the right and left edges of the movable board 5 and a corresponding one of the right and left lateral walls 36, 36 of the pallet 8 can be kept at a small value regardless of the height position of the movable board 5. This provides an advantage of being able to provide further enhanced appearance of the floor zone, and effectively prevent foreign substances, such as dusts, from getting into the internal space of the pallet 8 through the gap.

In the first embodiment, each of the right and left lateral walls 36, 36 of the pallet 8 is formed with the sliding slots 44a, 44b slidably penetrated by respective ones of the support shafts 28a, 28b of the movable board 5, and a portion of each of the support shafts 28a, 28b protruding outside the pallet 8 through a corresponding one of the sliding slots 44a, 44b is supported by the support members 30 disposed outside each of the lateral walls 36, 36 of the pallet 8. In this case, each of the lateral walls 36, 36 of the pallet 8 is located at a position between the movable board 5 and each of the support members 30, 30 supporting the movable board 5, to allow the support structure of the movable board 5 to be hidden by the pallet 8. This provides an advantage of being able to desirably maintain the enhanced appearance of the floor zone. Further, the guide grooves 33a, 33b for slidably supporting the support shafts 28a, 28b of the movable board 5 are formed in the standing wall 31 of each of the support members 30, 30. This provides an advantage of being able to guide the portions of the support shafts 28a, 28b protruding outside the sliding slots 44a, 44a, 44b, 44b of the pallet 8, along the respective guide grooves 33a, 33a, 33b, 33b, so as to smoothly displace the movable board 5 upwardly or downwardly.

In the first embodiment, the front inclined wall 38 of the pallet 8 extending from the front edge of the bottom wall 35 thereof obliquely upwardly and frontwardly is formed to have an inclination angle approximately equal to that of the guide grooves 33a, 33a, 33b, 33b, to allow the front inclined wall 38 to extend a movement locus of the front edge of the movable board 5. In this case, a gap between the front inclined wall 38 and the front edge of the movable board 5 can be kept at a small value regardless of the height position of the movable board 5. This provides an advantage of being able to provide further enhanced appearance of the floor zone.

In the first embodiment, the footrest portion 45 for allowing a seat occupant to place his/her left foot thereon is formed in the front lateral end portion of the pallet 8. As compared with another structure, for example, where a footrest portion is provided at a front end of the front floor portion 13, the above structure has an advantage of being able to effectively prevent the footrest portion from hindering the operation of mounting the pallet 8 on the front floor portion 13 (in the concave space 17), so as to effectively provide enhanced efficiency of the mounting operation for the pallet 8.

Specifically, if a footrest portion is provided at the front end of the front floor portion 13, it is necessary to form a cutout or the like in the pallet 8 at a position corresponding to the footrest portion, and mount the pallet 8 on the front floor portion 13 while paying careful attention to avoiding interference between the pallet 8 and the footrest portion. By contrast, the above structure designed to form the footrest portion 45 in the pallet 8 can eliminate such needs to have an advantage of being able to provide the footrest portion 45 readily and adequately while maintaining the enhanced efficiency of the mounting operation for the pallet 8.

In the first embodiment, the pallet 8 is formed with the inclined fence 41 which extends obliquely upwardly from the upper edge of the lateral wall 36 of the pallet 8 on the side of the floor tunnel 2, toward the lateral wall of the floor tunnel 2. This makes it possible to prompt an occupant seated in the occupant seat 4 to place his/her left foot on an adequate position, such as the footrest portion 45, so as to provide an advantage of being able to effectively prevent deterioration in safety of the occupant during a vehicle collision or the like.

Specifically, if the inclined fence 41 is formed to extend in a horizontal direction as with the deck 40 formed on the side of the side sill 1, the occupant can readily place his/her left foot on the horizontal surface thereof. In this case, the occupant is likely to have an undesirable posture in terms of safety. By contrast, the inclined fence 41 having an inclined surface in the first embodiment can effectively prevent the occupant from placing his/her left foot thereon to provide an advantage of allowing the occupant to have a proper posture where the left foot is placed on the footrest portion 45 or the like, so as to adequately protect the occupant during a vehicle collision or the like.

The footrest portion 45 in the first embodiment is integrally formed with the remaining portion of the pallet 8. However, the footrest portion 45 has to be formed to largely protrude upwardly relative to the remaining portion. Thus, the footrest portion 45 is likely to involve some problem in a process of molding it integrally with the remaining portion using resin. In this case, the footrest portion 45 may be prepared as a separate resin component from the remaining portion of the pallet 8, and then attached to the pallet 8.

In the first embodiment, the movable board 5 to be disposed above (the front floor portion 13 of) the vehicle body floor 3 comprises the plate-shaped board segment 22 for allowing a seat occupant to place his/her feet to place thereon, and the rectangular-shaped frame member 24 which has a stiffness greater than that of the board segment 22 and supports the board segment 22. This provides an advantage of being able to effectively reduce a weight of the movable board 5 while ensuring adequate stiffness of the movable board 5.

Specifically, the movable board 5 in the first embodiment where the board segment 22 for allowing a seat occupant to place his/her feet thereon is supported by the high-stiffness frame member 24. Thus, even if the board segment 22 itself does not have so high stiffness, the movable board 5 can have relatively high stiffness in its entirety. That is, the movable board 5 can have a stiffness enough to withstand a load of the feet of the seat occupant, without any difficulty. In addition, while the board segment 22 has no need for high stiffness as described above, it is formed to have a relatively large area as compared with that of the rectangular-shaped frame 24. Thus, the board segment 22 can be made of a lightweight material, such as a resin material, to effectively reduce a weight of the movable board 5 while ensuring the sufficient stiffness of the entire movable board 5. This structure has an advantage of readily satisfying both needs for lightweight and high-stiffness of the movable board 5.

In the first embodiment, (the rod 73 of) the driving-force transmission mechanism 7 for transmitting a driving force of the electric motor 6 to the movable board 5 is connected to the frame member 24 having higher stiffness than that of the board segment 22, through the connection member 57. Thus, a driving force input from the driving-force transmission mechanism 7 can be efficiently transmitted to the movable board 5 to displace the movable board 5 upwardly or downwardly in an easy and reliable manner. In addition, the board segment 22 is detachably supported by the frame member 24. Thus, the vehicle body floor 3 below the movable board 5 (i.e., the front floor portion 13) can be exposed to the outside only by detaching the board segment 22 from the frame member 24, to provide an advantage of being able to facilitate cleaning of the vehicle body floor 3.

In the first embodiment, the frame member 24 is provided with the reinforcing plates 26, 27 connecting between the opposed ones of the four rods thereof, and the board segment 22 is supported on the reinforcing plates 26, 27. This makes it possible to increase stiffness for supporting the board segment 22 for allowing a seat occupant to place his/her feet thereon, so as to provide an advantage of being able to reliably support a load of the feet of the seat occupant.

In the first embodiment, the rod 73 of the driving-force transmission mechanism 7 is connected to the rear end of the movable board 5 through the connection member 57, to input a force directed a selected one of the frontward and rearward directions of the vehicle body, into the rear end of the movable board 5 through the connection member 57, so as to displace the movable board 5 upwardly or downwardly. However, the location for receiving the input force is not limited to the rear end of the movable board 5 as in the first embodiment, but may be any rearward region of the movable board 5 (i.e., a rear portion of the movable board 5).

Further, although the movable board 5 in the first embodiment is designed to be moved between two height positions, i.e., the lowermost and uppermost height positions, it is understood that one or more intermediate height positions may be set in addition to the lowermost and uppermost height positions.

Although the movable floor apparatus according to the first embodiment includes the right and left support members 30, 30 formed as two separate components, it is understood that a single support member integrally formed with the right and left standing walls 36, 36 may be used in place of the support members 30, 30.

Second Embodiment

Figure 14:
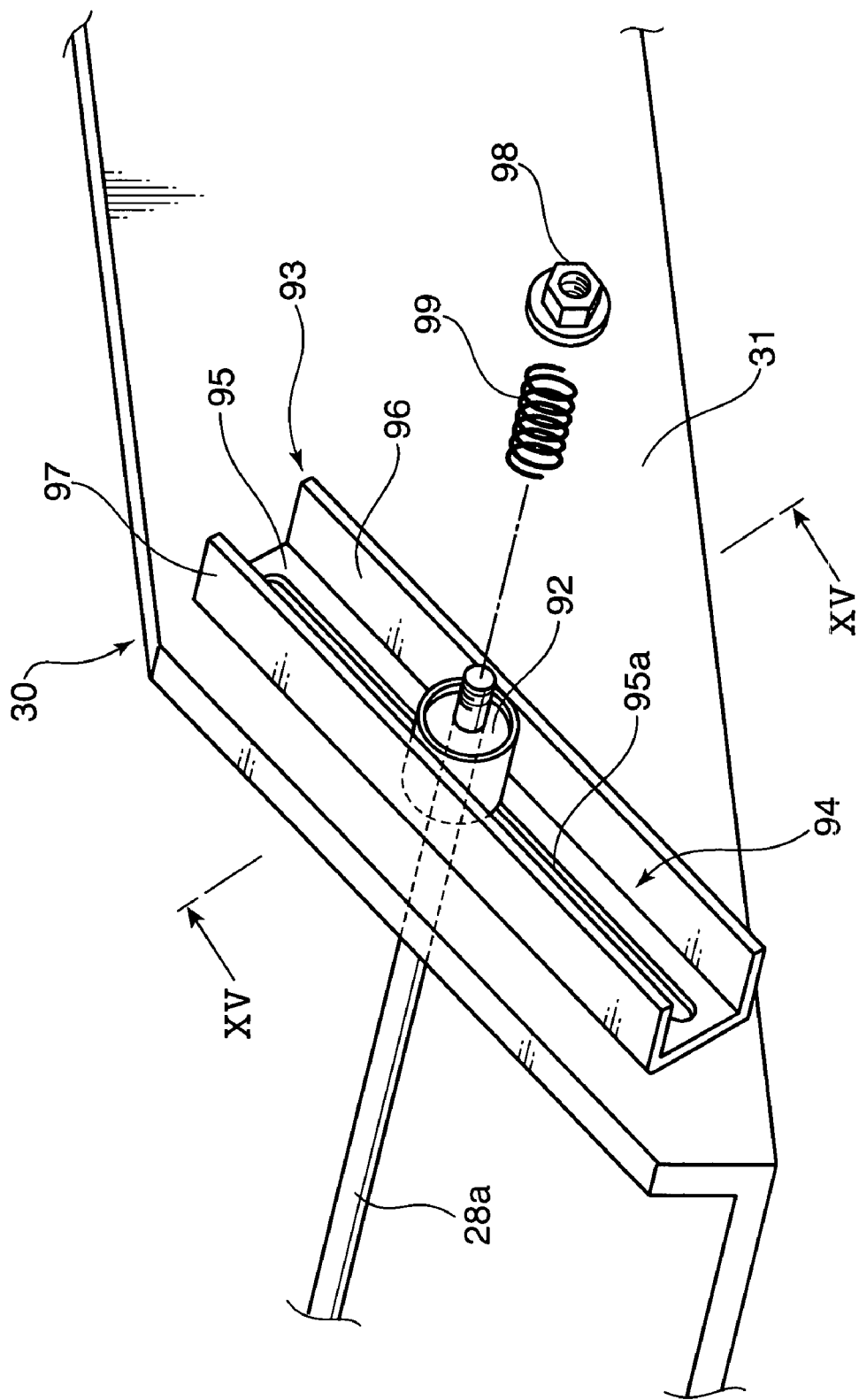
FIG. 14 is a fragmentary perspective view for explaining a movable floor apparatus according to a second embodiment of the present invention.
Figure 15:
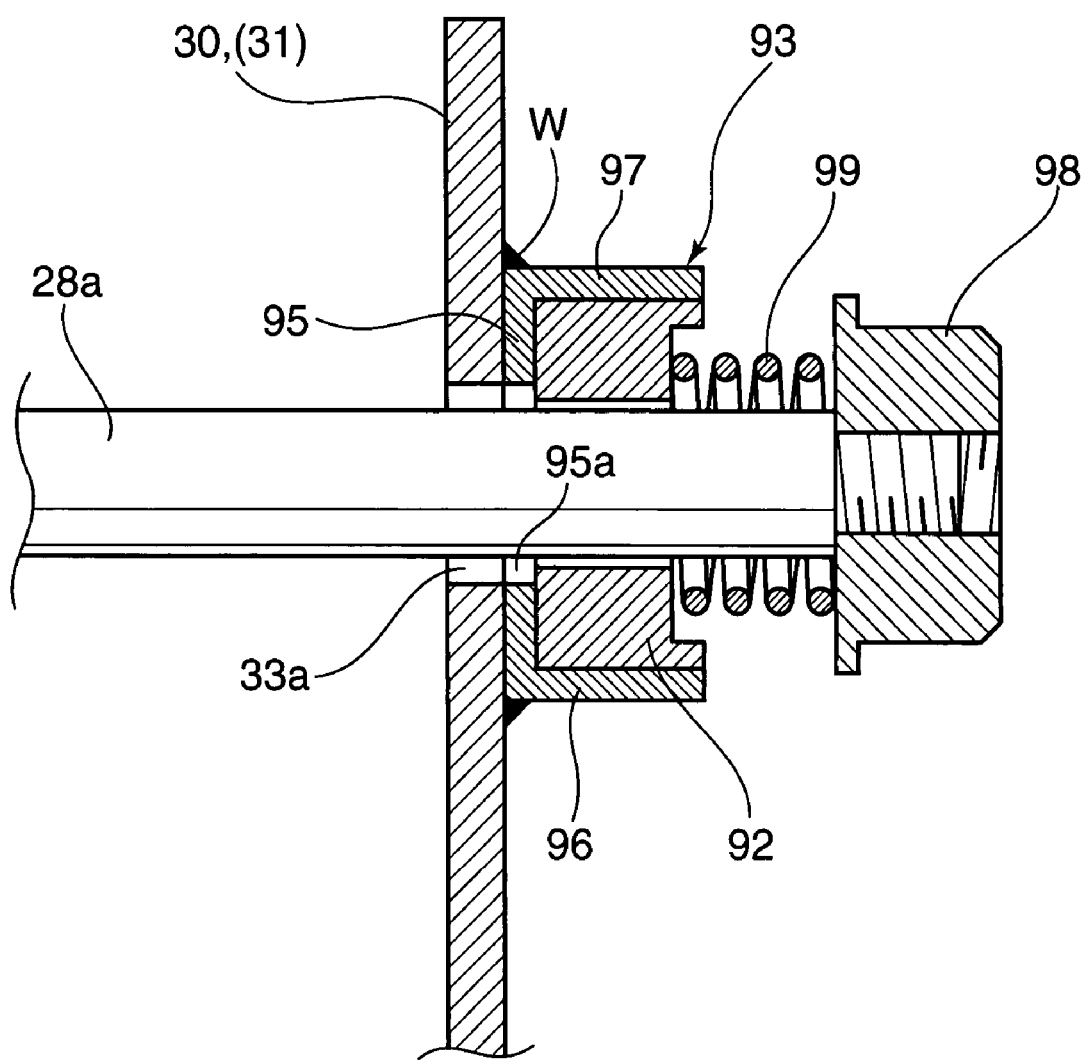
FIG. 15 is a sectional view taken along the line XV-XV in FIG. 14.

In the first embodiment, as guide means to guide the upward/downward movement of the movable board 5, the guide grooves 33a, 33b to be penetrated by respective ones of the support shafts 28a, 28b of the movable board 5 are formed in the standing wall 31 of each of the support members 30, 30, and the lateral movement of each of the support shafts 28a, 28b is restricted by the speed nut 29 attached to each of the right and left ends of the support shafts 28a, 28b. In this structure, if one or both of the support members 30, 30 are mounted on the vehicle body floor 3 in incorrect positions to cause an misalignment in relative position between the rear guide grooves 33a, 33a and between the front guide grooves 33b, 33b in the standing wall 31, each of the support shafts 28a, 28b will be supported with a lateral inclination. This is likely to cause an undesirable situation where each of the support shafts 28a, 28b is unstably supported with wobbling, or the speed nuts 29, - -, 29 are brought into contact with respective peripheral edges of the guide grooves 33a, 33a, 33b, 33b to preclude the support shafts 28a, 28b from being smoothly moved along the guide grooves 33a, 33a, 33b, 33b. Although the above situation can be avoided by adequately adjusting the mounting positions of the support members 30, 30, it is desirable to provide a structure capable of omitting such a fine adjustment, in view of enhancement in production efficiency. A movable floor apparatus according to a second embodiment of the present invention is directed to meet this need. The following description will be made with a focus on a specific structure of the improvement, based on FIGS. 14 and 15. In FIGS. 14 and 15, the same element or component as that in the first embodiment is defined by the same reference numeral or code, and its detailed description will be omitted.

In the second embodiment illustrated in FIGS. 14 and 15, a tubular-shaped sleeve 92 is attached to a rear support shaft 28a to surround each of opposite ends thereof, and a sleeve guide 93 formed in an approximately angled-C shape in section to have a sleeve guide groove 94 adapted to slidably support the sleeve 92 is fixed onto an outer surface of a standing wall 31 of each of a pair of right and left support members 30, by welding (through a weld bead W). This sleeve guide 93 has a base plate 95 which is fixed along the outer surface of the standing wall 31, and formed with an elongate hole 95a corresponding to a guide groove 33a formed in the support member 30, and a pair of side plates 96, 97 protruding outside from respective ones of opposite upper and lower side edges of the base plate 95. The sleeve 92 is supported by these plates 95 to 97 in a contact manner. Specifically, an outer surface of the base plate 95 is in slidable contact with an axially inner end surface of the sleeve 92, and each of opposed surfaces of the pair of side plates 96, 97 is in slidable contact with an outer peripheral surface of the sleeve 92. The sleeve guide groove 94 is defined as a space surrounded by these contact surfaces of the plates 95 to 97.

The sleeve guide 93 is fixed to allow the sleeve guide groove 94 to extend with a frontwardly-upward inclination, as shown in FIG. 14. Thus, the support shaft 28a and a movable board 5 are supported in a liftable and lowerable manner through the sleeve 92 adapted to be slidingly moved along a direction of the inclination of the sleeve guide groove 94. That is, in the second embodiment, guide means to guide an upward/downward movement of the movable board 5 consists of the sleeve guide groove 94. Further, as shown in FIG. 15, a certain level of gap is defined between the support shaft 28a and the guide groove 33a formed in the support member 30. This means that the guide groove 33a does not have a function of determining a movement locus of the support shaft 28a, but only the sleeve guide groove 94 serves as the guide means.

A nut 98 is threadedly engaged with each of opposite distal ends of the support shaft 28a, and a coil spring 99 serving as bias means to bias the sleeve 92 toward an axially central portion of the support shaft 28a is provided between the nut 98 and the sleeve 92. While the above description has been made about the rear support shaft 28a, a front support shaft 28b of the movable board 5 has the same structure as that of the rear support shaft 28a.

As described above, in the second embodiment, the tubular-shaped sleeve 92 is attached to each of the right and left ends of each of the support shafts 28a, 28b of the movable board 5 to surround the outer peripheral surface of the end. Further, the sleeve 92 is slidably supported along the sleeve guide groove 94 in slidable contact with the axially inward end surface and the outer peripheral surface of the sleeve 92. In this case, the sleeve 92 having a larger diameter than that of each of the support shafts 28a, 28b is slidingly moved along the sleeve guide groove 94 having a relatively large width. This provides an advantage of being able to smoothly displace the movable board 5 upwardly and downwardly with further enhanced stability.

In addition, the coil spring 99 is provided to bias the sleeve 92 toward the axially central portion of each of the support shafts 28a, 28b. Thus, even if an misalignment in relative position between the front sleeve guide grooves 94, 94 and between the rear sleeve guide grooves 94, 94 due to error in mounting position of the right and left support members 30, 30, the sleeve 92 can be reliably brought into contact with the contact surfaces of the sleeve guide groove 94 with an adequate level of force, to reliably prevent an undesirable situation where a gap (i.e., wobbling) between the sleeve 92 and the contact surface of the sleeve guide groove 94 occurs to cause instability in support state of the sleeve 92 and preclude the sleeve 92 from being smoothly moved along the sleeve guide groove 94. This structure designed to support the support shafts 28a, 28b and the movable board 5 in a liftable and lowerable manner through the sleeve 92 capable of being smoothly moved along the sleeve guide groove 94 provides an advantage of being able to further smoothly guide the upward/downward movement of the movable board 5.

Third Embodiment

Figure 16:
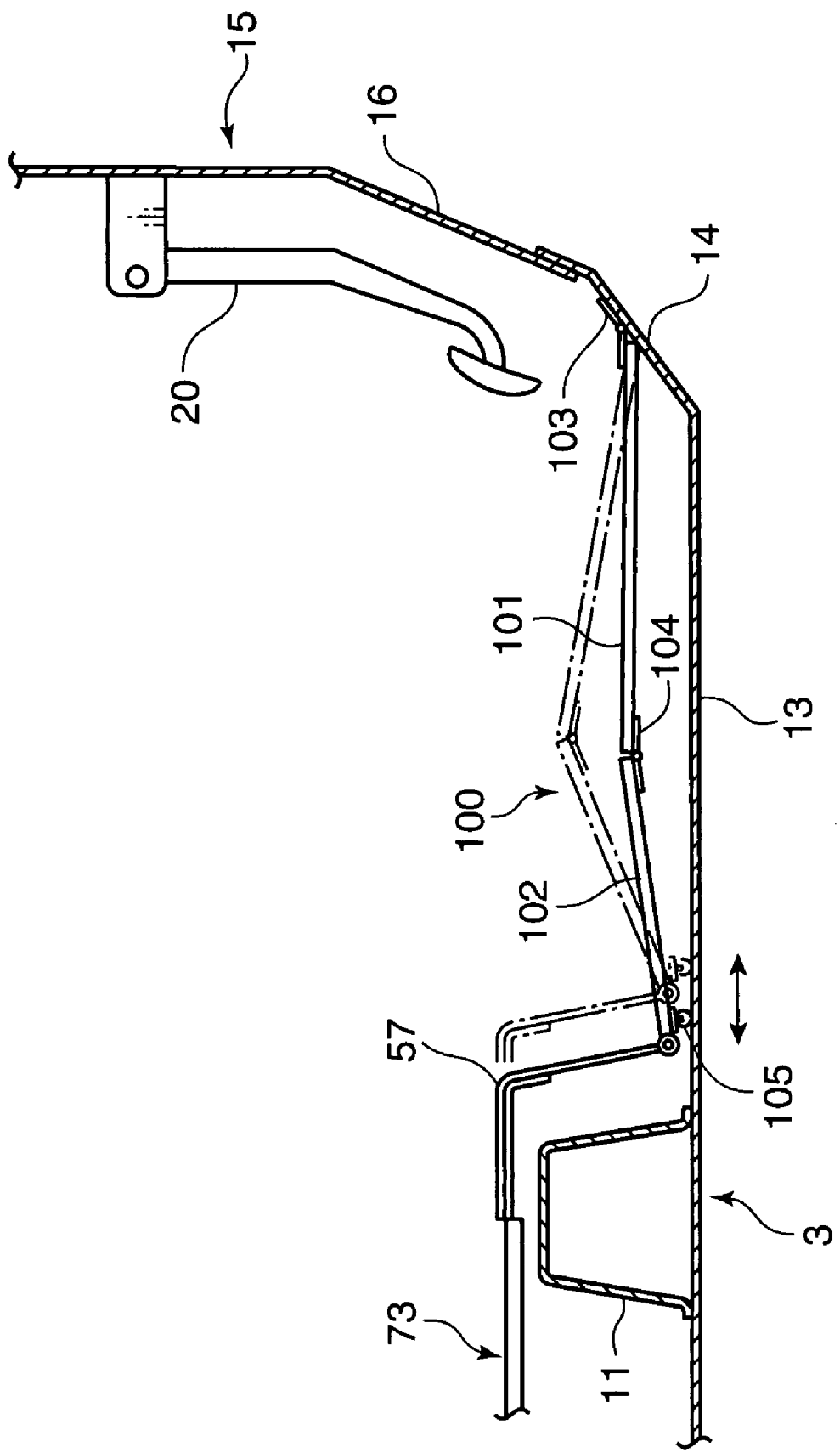
FIG. 16 is a fragmentary schematic diagram for explaining a movable floor apparatus according to a third embodiment of the present invention.

In the first embodiment, a force directed in a selected one of the frontward and rearward directions of the vehicle body is input into the rear end of the flat plate-shaped movable board 5 through the driving-force transmission mechanism 7, to displace the movable board 5 upwardly or downwardly according to the frontward or rearward force while keeping the movable board 5 in a horizontal posture. A movable floor apparatus according to a third embodiment illustrated in FIG. 16 shows one alternative structure to the above structure. In FIG. 16, the same element or component as that in the first embodiment is defined by the same reference numeral or code, and its detailed description will be omitted.

In the third embodiment, the movable floor apparatus comprises a movable board 100 which includes a front panel 101 having a front edge pivotally supported by a floor kick-up portion 14 of a vehicle body floor 3 through a hinge member 103, and a rear panel 102 which has a front edge connected to a rear edge of the front panel 101 through a hinge member 104 in an upwardly bendable manner. In this movable floor apparatus, a force directed in a selected one of frontward and rearward directions of a vehicle body is input into a rear portion (or rear end) of the movable board 100 through a rod 73 and a connection member 57 to move the rear portion of the rear panel 102 in the frontward or rearward direction and displace the connection portion between the rear panel 102 and the front panel 101 upwardly or downwardly so as to adjust a height position of the movable board 100 according to the frontward or rearward force. In the third embodiment, a roller 105 is fixed to a lower surface of a rear portion of the rear panel 102 to allow the rear panel 102 to be slidingly displaced on a portion of the vehicle body floor 3 below the rear portion of the rear panel 102, in a smooth manner.

As above, the present invention has been specifically described based on the embodiments thereof. The features and advantages of the present invention will be collectively described below.

The present invention is directed to movable floor apparatus for a vehicle, which includes a movable board disposed beneath feet of an occupant seated in an occupant seat, to cover an upper surface of a vehicle body floor in a liftable and lowerable manner, and characterized by comprising a drive source disposed below the occupant seat, and a driving-force transmission mechanism adapted, according to a driving force of the drive source, to input a force directed in a selected one of frontward and rearward directions of a vehicle body, into a rear portion of the movable board, wherein the movable board is supported in such a manner as to be selectively displaced upwardly and downwardly in response to respective ones of the frontward and rearward forces input from the driving-force transmission mechanism.

In the movable floor apparatus of the present invention, a force directed in a selected one of the frontward and rearward directions of the vehicle body is input into the rear portion of the movable board disposed beneath feet of the seat occupant, through driving-force transmission mechanism, to selectively displace the movable board upwardly or downwardly in response to the frontward or rearward force. Thus, as compared with the movable floor apparatus disclosed in the Patent Publication 1 where the lifting/lowering drive linkage is disposed below the movable board, the movable floor apparatus of the present invention has an advantage of being able to selectively displace the movable board upwardly and downwardly without installing any particular mechanism below the movable board, so as to allow the lowermost height position of the movable board to be set at a lower level. This movable board adapted to be set at a lower lowermost height position makes it possible to advantageously achieve a movable floor apparatus capable of coping with various seating postures with enhanced flexibility.

Preferably, in the movable floor apparatus of the present invention, the movable board has opposite right and left edges supported by respective ones of a pair of right and left support members provided on the vehicle body floor to extend upwardly therefrom, wherein the support members has guide means adapted to guide the movable board in such a manner that the movable board receiving either one of the frontward and rearward forces from the driving-force transmission mechanism is lifted or lowered while being moved in the direction of the force.

In the above movable floor apparatus, the support member supporting the right and left lateral edges is provided with the guide means adapted to guide the upward/downward movement of the movable board. This feature provides an advantage of being able to support the movable board in a simple and compact structure, and selectively displace the movable board upwardly and downwardly along the guide means in a stable and reliable manner.

Preferably, in the above movable floor apparatus, the movable board includes a support shaft which extends in a lateral direction of the vehicle body and has opposite right and left ends supported by the respective ones of the right and left support members, and the guide means consists of a guide groove adapted to slidably support the support shaft and defined to extend with a frontwardly-upward inclination.

This feature provides an advantage of reliably guiding the upward/downward movement of the movable board by a simple structure designed to slidably support the support shaft of the movable board along the guide groove having a frontwardly-upward inclination.

As one alternative to the above structure, a tubular-shaped sleeve may be attached to each of the right and left ends of the support shaft to surround an outer peripheral surface of the end, and the guide means may consist of a sleeve guide groove which is defined by a contact surface slidable relative to an axially inward end surface and an outer peripheral surface of the sleeve, in such a manner as to extend with a frontwardly-upward inclination. Further, the movable board may include bias means provided between the sleeve and a corresponding one of right and left distal ends of the support shaft, to bias the sleeve toward an axially central portion of the support shaft.

In this structure, the tubular-shaped sleeve attached to each of the right and left ends of the support shaft of the movable board is slidably supported along the sleeve guide groove in slidable contact with the axially inward end surface and the outer peripheral surface of the sleeve. In this case, the sleeve having a larger diameter than that of the support shaft is slidingly moved along the sleeve guide groove having a relatively large width. This feature provides an advantage of being able to smoothly displace the movable board upwardly and downwardly with further enhanced stability. In addition, the bias means adapted to bias the sleeve toward the axially central portion of the support shaft can reliably bring the sleeve into contact with the contact surface of the sleeve guide groove. This feature provides an advantage of being able to further smoothly guide the upward/downward movement of the movable board.

In the movable floor apparatus of the present invention, when the occupant seat includes a pair of right and left lower rails fixed relative to the vehicle body to extend in the frontward/rearward direction of the vehicle body, and a pair of right and left upper rails slidably supported along respective ones of the right and left lower rails, the movable floor apparatus preferably includes a lateral member which extends in a lateral direction of the vehicle body to connect between the right and left lower rails, and supports the driving-force transmission mechanism.

In this structure, the right and left lower rails fixed relatively to the vehicle body is connected to each other by the lateral member, and the driving-force transmission mechanism is supported by the lateral member. This feature provides an advantage of being able to ensure relatively high mounting stiffness for the driving-force transmission mechanism, and efficiently lay out the driving-force transmission mechanism through effective utilization of a dead space below the occupant seat.

Preferably, in the above movable floor apparatus, the driving-force transmission mechanism includes a rod which extends in the frontward/rearward direction of the vehicle body and has a front end connected to the rear portion of the movable board, and a gear box adapted to interlockingly connect between the rod and an output shaft of the drive source, wherein the rod is adapted, according to the driving force of the drive source, to be selectively moved frontwardly and rearwardly so as to allow the respective ones of the frontward and rearward forces to be input into the movable board through the rod.

In this structure, the rod interlockingly connected to the drive source through the gear box is connected to the rear portion of the movable board so as to allow the respective ones of the frontward and rearward forces to be input into the rear portion of the movable board according to the frontward/rearward movement of the rod. This feature provides an advantage of being able to reliably transmit a driving force of the drive source to the movable board by a simple structure having low transmission loss.

In the above movable floor apparatus, when the vehicle body floor is provided with a cross member which protrudes upwardly therefrom and extends in the lateral direction of the vehicle body so as to support a front end of the occupant seat, the rod is preferably connected to the movable board through a connection member formed and disposed to extend across and above the cross member and then extend downwardly.

In this structure, the rod and the movable board are connected to each other while avoiding interference with the cross member protrudingly provided on the vehicle body flood. This feature provides an advantage of being able to transmit a driving force of the drive source to the movable board, in a simple and economic structure without modifying an existing structural member, such as the cross member.

In the movable floor apparatus of the present invention, when the vehicle body floor is formed between a side sill extending in the frontward/rearward direction along a lateral edge of the vehicle body and a floor tunnel extending in the frontward/rearward direction in a laterally central region of the vehicle body, and provided with a cross member which protrudes upwardly therefrom and extends in a lateral direction of the vehicle body so as to support a front end of the occupant seat, whereby the vehicle body floor is surrounded by a front wall of the cross member, respective lateral walls of the side sill and the floor tunnel, and a floor kick-up portion extending from a front edge of a bottom portion of the vehicle body floor, with a frontwardly-upward inclination, so as to define a concave space on the vehicle body floor, the movable floor apparatus preferably includes a pallet formed in a shape corresponding to that of the concave space and received and mounted in the concave space, wherein the movable board is supported in such a manner as to be selectively lifted and lowered inside the pallet.

In this structure, the pallet is mounted in the concave space surrounded by the side sill, the floor tunnel and others, and the movable board 5 is installed in the pallet in such a manner as to be displaced upwardly and downwardly in an internal space of the pallet separated from vehicle body-side members, such as the side sill and the floor tunnel. This feature provides an advantage of being able to effectively prevent a structural element, such as a protrusion and a step, of the vehicle body-side members, from hindering the upward/downward movement of the movable board, and provide enhanced appearance of a floor zone.

Preferably, in the above movable floor apparatus, the pallet has a bottom wall, and opposed right and left lateral walls which extend approximately vertically upwardly from respective ones of opposite right and left edges of the bottom wall along corresponding ones of the lateral walls of the side sill and the floor tunnel, and the movable board is adapted to be selectively lifted and lowered approximately vertically in front view in such a manner that each of opposite right and left edges thereof has a movement locus along a corresponding one of the right and left lateral walls of the pallet.

In this structure, a gap between each of the right and left edges of the movable board and a corresponding one of the right and left lateral walls of the pallet can be kept at a small value regardless of a height position of the movable board. This feature provides an advantage of being able to provide further enhanced appearance of the floor zone.

Preferably, in the above movable floor apparatus, the movable board includes a support shaft which extends in the lateral direction of the vehicle body, and each of the right and left lateral walls of the pallet is formed with a sliding slot slidably penetrated by a corresponding one of opposite right and left ends of the support shaft, wherein the movable floor apparatus includes a support member which has a pair of right and left standing walls disposed on the vehicle body floor at positions located outside respective ones of the right and left lateral walls of the pallet to extend approximately vertically from the vehicle body floor along the respective ones of the lateral walls of the pallet. Further, each of the standing walls of the support member preferably has a guide groove formed in a region corresponding to the sliding slot of the pallet, to slidably support a portion of the support shaft protruding outside the pallet through the sliding slot.

In the above structure, each of the portions of the support shaft of the movable board protruding outside respective ones of the slide slots of the pallet is slidably supported along a corresponding one of the guide grooves formed in the support member located outside the pallet. This feature provides an advantage of being able to hide the structure for supporting the movable board by the pallet so as to desirably maintain the enhanced appearance of the floor zone, and further smoothly displace the movable board upwardly or downwardly while guiding the support shaft along the guide grooves.

In the above movable floor apparatus, when the guide groove is formed to have a frontwardly-upward inclination oriented obliquely upwardly in the frontward direction of the vehicle body, the pallet preferably has a front inclined wall which extends from a front edge of the bottom wall thereof obliquely upwardly in the frontward direction of the vehicle body at an inclination angle approximately equal to that of the guide groove.

In this structures a gap between the front inclined wall and the front edge of the movable board can be kept at a small value regardless of the height position of the movable board. This provides an advantage of being able to provide further enhanced appearance of the floor zone.

Preferably, in the above movable floor apparatus, the pallet has a front lateral end portion formed as a footrest portion for allowing the occupant to place his/her left foot thereon.

As compared with another structure, for example, where a footrest portion is provided at a front end of the front floor portion, the above structure has an advantage of being able to provide the footrest portion readily and adequately while maintaining desired efficiency of a mounting operation for the pallet.

Preferably, in the above movable floor apparatus, the pallet is provided with an inclined fence which extends obliquely upwardly from an upper edge of the lateral wall of the pallet on the side of the floor tunnel, toward the lateral wall of the floor tunnel.

This structure makes it possible to prompt an occupant seated in the occupant seat to place his/her left foot on an adequate position, such as the footrest portion, so as to provide an advantage of being able to effectively prevent deterioration in safety of the occupant during a vehicle collision or the like.

Preferably, in the movable floor apparatus of the present invention, the movable board includes a plate-shaped board segment defining a loading surface for feet of the occupant, and a frame member which is made of a material having a stiffness greater than that of the board segment, and formed in a frame shape extending along an outer peripheral edge of the board segment to detachably support the board segment, wherein the driving-force transmission mechanism is connected to the frame member.

This structure has an advantage of being able to effectively reduce a weight of the movable board while ensuring adequate stiffness of the movable board, and efficiently transmit a driving force input from the driving-force transmission mechanism through the frame having relatively high stiffness.

Although the present invention has been fully described by way of example with reference to the accompanying drawings, it is to be understood that various changes and modifications depart from the scope of the present invention hereinafter defined, they should be construed as being included therein.

What is claimed is:

1. A movable floor apparatus for a vehicle, which includes a movable board disposed beneath feet of an occupant seated in an occupant seat, to cover an upper surface of a vehicle body floor, said movable floor apparatus comprising:
   a drive source disposed below said occupant seat;
   a driving-force transmission mechanism, according to a driving force of said drive source, for transmitting a force acting in a frontward or a rearward direction of a vehicle body to a rear portion of said movable board,
   a pair of right and left support members provided on said vehicle body floor to extend upwardly therefrom for supporting opposite right and left edges of said movable board, said support members having guide means adapted to guide said movable board in such a manner that said movable board receiving said frontwardly or rearwardly acting force from said driving-force transmission mechanism is lifted or lowered while being moved in the acting direction of said force; and
   said movable board includes a support shaft which extends in a lateral direction of the vehicle body and has opposite right and left ends supported by the respective ones of said right and left support members;
   wherein said movable board is supported in such a manner as to be selectively displaced upwardly and downwardly in response to said frontwardly or rearwardly acting force from said driving-force transmission mechanism; and
   said guide means consists of a guide groove adapted to slidably support said support shaft and defined to extend with a frontwardly-upward inclination.

2. A movable floor apparatus for a vehicle, which includes a movable board disposed beneath feet of an occupant seated in an occupant seat, to cover an upper surface of a vehicle body floor, said movable floor apparatus comprising:
   a drive source disposed below said occupant seat;
   a driving-force transmission mechanism, according to a driving force of said drive source, for transmitting a force acting in a frontward or a rearward direction of a vehicle body to a rear portion of said movable board, and
   a pair of right and left support members provided on said vehicle body floor to extend upwardly therefrom for supporting opposite right and left edges of said movable board, said support members having guide means adapted to guide said movable board in such a manner that said movable board receiving said frontwardly or rearwardly acting force from said driving-force transmission mechanism is lifted or lowered while being moved in the acting direction of said force;
   said movable board includes a support shaft which extends in a lateral direction of the vehicle body and has opposite right and left ends supported by the respective ones of said right and left support members, and a tubular-shaped sleeve attached to each of the right and left ends of said support shaft to surround an outer peripheral surface of said end; and
   said guide means includes a sleeve guide groove which is defined by a contact surface slidable relative to an axially inward end surface and an outer peripheral surface of said sleeve, in such a manner as to extend with a frontwardly-upward inclination,
   wherein said movable board further includes bias means provided between said sleeve and a corresponding one of right and left distal ends of said support shaft, to bias said sleeve toward an axially central portion of said support shaft; and
   said movable board is supported in such a manner as to be selectively displaced upwardly and downwardly in response to said frontwardly or rearwardly acting force from said driving-force transmission mechanism.

3. A movable floor apparatus for a vehicle, which includes a movable board disposed beneath feet of an occupant seated in an occupant seat, to cover an upper surface of a vehicle body floor, said movable floor apparatus comprising:
   a drive source disposed below said occupant seat; and
   a driving-force transmission mechanism, according to a driving force of said drive source, for transmitting a force acting in a frontward or a rearward direction of a vehicle body to a rear portion of said movable board,
   said occupant seat includes a pair of right and left lower rails fixed relative to the vehicle body to extend in the frontward/rearward direction of the vehicle body, and a pair of right and left upper rails slidably supported along respective ones of said right and left lower rails,
   wherein said movable floor apparatus includes a lateral member which extends in a lateral direction of the vehicle body to connect between said right and left lower rails, and support said driving-force transmission mechanism, and
   said movable board is supported in such a manner as to be selectively displaced upwardly and downwardly in response to said frontwardly or rearwardly acting force from said driving-force transmission mechanism.

4. The movable floor apparatus as defined in claim 3, wherein said driving-force transmission mechanism includes a rod which extends in the frontward/rearward direction of the vehicle body and has a front end connected to the rear portion of said movable board, and a gear box adapted to interlockingly connect between said rod and an output shaft of said drive source, wherein said rod is adapted, according to the driving force of said drive source, to be selectively moved frontwardly and rearwardly so as to allow the respective ones of said frontward and rearward forces to be input into said movable board through said rod.

5. The movable floor apparatus as defined in claim 4, wherein said vehicle body floor is provided with a cross member which protrudes upwardly therefrom and extends in the lateral direction of the vehicle body so as to support an front end of said occupant seat, wherein said rod is connected to said movable board through a connection member formed and disposed to extend across and above said cross member and then extend downwardly.

6. A movable floor apparatus for a vehicle, which includes a movable board disposed beneath feet of an occupant seated in an occupant seat, to cover an upper surface of a vehicle body floor, said movable floor apparatus comprising:
  a drive source disposed below said occupant seat; and
  a driving-force transmission mechanism, according to a driving force of said drive source, for transmitting a force acting in a frontward or a rearward direction of a vehicle body to a rear portion of said movable board,
  wherein said vehicle body floor is formed between a side sill extending in the frontward/rearward direction along a lateral edge of the vehicle body and a floor tunnel extending in the frontward/rearward direction in a laterally central region of the vehicle body, said vehicle body floor being provided with a cross member which protrudes upwardly therefrom and extends in a lateral direction of the vehicle body so as to support a front end of said occupant seat, whereby said vehicle body floor is surrounded by a front wall of said cross member, respective lateral walls of said side sill and said floor tunnel, and a floor kick-up portion extending from a front edge of a bottom portion of said vehicle body floor, with a frontwardly-upward inclination, so as to define a concave space on said vehicle body floor;
  wherein said movable floor apparatus includes a pallet formed in a shape corresponding to that of said concave space and received and mounted in said concave space, wherein said movable board is supported in such a manner as to be selectively lifted and lowered inside said pallet, and
  said movable board is supported in such a manner as to be selectively displaced upwardly and downwardly in response to said frontwardly or rearwardly acting force from said driving-force transmission mechanism.

7. The movable floor apparatus as defined 6, wherein said pallet has a front lateral end portion formed as a footrest portion for allowing the occupant to place his/her left foot thereon.

8. The movable floor apparatus as defined 6, wherein said pallet is provided with an inclined fence which extends obliquely upwardly from an upper edge of the lateral wall of said pallet on the side of said floor tunnel, toward the lateral wall of said floor tunnel.

9. The movable floor apparatus as defined in claim 6, wherein:
  said pallet has a bottom wall, and opposed right and left lateral walls which extend approximately vertically upwardly from respective ones of opposite right and left edges of said bottom wall along corresponding ones of the lateral walls of said side sill and said floor tunnel; and
  said movable board is adapted to be selectively lifted and lowered approximately vertically in front view in such a manner that each of opposite right and left edges thereof has a movement locus along a corresponding one of said right and left lateral walls of said pallet.

10. The movable floor apparatus as defined in claim 9, wherein:
  said movable board includes a support shaft which extends in the lateral direction of the vehicle body; and
  each of said right and left lateral walls of said pallet is formed with a sliding slot slidably penetrated by a corresponding one of opposite right and left ends of said support shaft,
  wherein said movable floor apparatus includes a support member which has a pair of right and left standing walls disposed on said vehicle body floor at positions located outside respective ones of said right and left lateral walls of said pallet to extend approximately vertically from said vehicle body floor along the respective ones of said lateral walls of said pallet, each of said standing walls of said support member having a guide groove formed in a region corresponding to said sliding slot of said pallet, to slidably support a portion of said support shaft protruding outside said pallet through said sliding slot.

11. The movable floor apparatus as defined in claim 10, wherein:
  said guide groove is formed to have a frontwardly-upward inclination oriented obliquely upwardly in the frontward direction of the vehicle body; and
  said pallet has an inclined front wall which extends from a front edge of said bottom wall thereof obliquely upwardly in the frontward direction of the vehicle body at an inclination angle approximately equal to that of said guide groove.

12. A movable floor apparatus for a vehicle, which includes a movable board disposed beneath feet of an occupant seated in an occupant seat, to cover an upper surface of a vehicle body floor, said movable floor apparatus comprising:
  a drive source disposed below said occupant seat; and
  a driving-force transmission mechanism, according to a driving force of said drive source, for transmitting a force acting in a frontward or a rearward direction of a vehicle body to a rear portion of said movable board,
  wherein said movable board includes:
  a plate-shaped board segment defining a loading surface for feet of the occupant; and
  a frame member which is made of a material having a stiffness greater than that of said board segment, and formed in a frame shape extending along an outer peripheral edge of said board segment to detachably support said board segment,
  wherein said driving-force transmission mechanism is connected to said frame member, and
  said movable board is supported in such a manner as to be selectively displaced upwardly and downwardly in response to said frontwardly or rearwardly acting force from said driving-force transmission mechanism.

* * * * *